(12) United States Patent
Gosz et al.

(10) Patent No.: US 7,354,264 B2
(45) Date of Patent: Apr. 8, 2008

(54) METHOD AND SYSTEM FOR CONTROLLING PRODUCT FLOW ON A FOOD PRODUCT MOLDING MACHINE

(75) Inventors: Rick G. Gosz, Oshkosh, WI (US); Mark A. Kubsh, Francis Creek, WI (US)

(73) Assignee: Patriot Universal Holdings, LLC., Hilbert, WI (US)

( * ) Notice: Subject to any disclaimer, the term of this patent is extended or adjusted under 35 U.S.C. 154(b) by 195 days.

(21) Appl. No.: 10/977,879

(22) Filed: Oct. 28, 2004

(65) Prior Publication Data

US 2005/0153039 A1 Jul. 14, 2005

Related U.S. Application Data

(60) Provisional application No. 60/515,157, filed on Oct. 28, 2003, provisional application No. 60/515,089, filed on Oct. 28, 2003, provisional application No. 60/515,189, filed on Oct. 28, 2003, provisional application No. 60/515,858, filed on Oct. 30, 2003.

(51) Int. Cl.
*A22C 5/00* (2006.01)
*A21C 1/00* (2006.01)

(52) U.S. Cl. .......................... 425/447; 249/92; 426/512

(58) Field of Classification Search ................ 425/427, 425/447, 145, 556, 562, 574, 205; 249/92; 426/486, 512, 514, 517, 518, 519
See application file for complete search history.

(56) References Cited

U.S. PATENT DOCUMENTS

| | | | | |
|---|---|---|---|---|
| 4,054,967 A | * | 10/1977 | Sandberg et al. | 426/512 |
| 4,372,008 A | * | 2/1983 | Sandberg | 425/562 |
| 4,597,134 A | * | 7/1986 | Wagner | 425/574 |
| 5,645,862 A | * | 7/1997 | Sable et al. | 425/73 |
| 5,655,436 A | * | 8/1997 | Soper | 99/353 |
| 5,795,610 A | * | 8/1998 | London | 426/512 |
| 5,980,228 A | * | 11/1999 | Soper | 425/145 |
| 6,398,540 B1 | * | 6/2002 | Burroughs et al. | 425/447 |
| 7,125,245 B2 | * | 10/2006 | Hansen et al. | 425/556 |
| 7,207,789 B2 | * | 4/2007 | Gosz et al. | 425/150 |
| 7,229,277 B2 | * | 6/2007 | Pasek et al. | 425/556 |
| 7,255,554 B2 | * | 8/2007 | Lamartino et al. | 425/547 |
| 2003/0047833 A1 | * | 3/2003 | Bortone et al. | 264/167 |

* cited by examiner

*Primary Examiner*—Yogendra N. Gupta
*Assistant Examiner*—Dimple Bodawala
(74) *Attorney, Agent, or Firm*—Philip M. Weiss; Weiss & Weiss

(57) ABSTRACT

A manifold for a food product molding machine, which balances the flow and pressure of the food product over a wide fill area. The invention further relates to a feed system for a food product molding machine which has a multiple plunger configuration which increases the capacity of the food product molding machine. The invention further provides a valve for controlling the flow of food product molding machine. A breather vent assembly and auger cover is configured to return exhaust air and excess food product to the food product supply.

1 Claim, 22 Drawing Sheets

METHOD AND SYSTEM FOR CONTROLLING PRODUCT FLOW ON A FOOD PRODUCT MOLDING MACHINE

RELATED APPLICATIONS

The present application claims priority to provisional patent application Ser. Nos. 60/515,157, 60/515,089, 60/515,189 all filed Oct. 28, 2003 and 60/515,858 filed Oct. 30, 2003.

FIELD OF INVENTION

The present invention relates to a method and system for controlling product flow on a food product molding machine. A manifold balances the flow and pressure of the food product over a wide fill area. A feed system has a multiple plunger configuration which increases the capacity of the food product molding machine. A valve controls the flow of food to a food product molding machine. A breather vent assembly and auger cover is configured to return exhaust air and excess food product to the food product supply.

BACKGROUND OF THE INVENTION

Before automation, consumers generally formed patties of food product by hand. However demand (e.g., the fast-food industry) for high-speed and high-volume production of food products led to the development of automated machines configured to provide molded food product. Generally, such machines mold the food product under pressure into patties of various shapes and sizes. A typical application for food product molding machines is in the production of hamburger patties. Yet, the type of food product (e.g., vegetables, meat, fish, etc.) and shape (e.g., rods, patties, etc.) can vary. The molded food products are distributed to restaurants, grocery stores, etc. The demand for high volume, high-speed food product molding machinery continues to grow.

However, prior art food product molding machines have several drawbacks. For example, buyers want more capacity than is available from known food product molding machinery. Furthermore, controlling and balancing the increased flow of food product through known food product molding machines is difficult while maintaining the quality of the molded food product.

As can be seen, the present state of the art of manifolds and feed systems incorporated into food product molding machines has definite shortcomings.

Known food product molding machines include tube or cylindrical valves to control the pressure and flow rate of food product forced by the pump assemblies into the cavities of the mold plates. These known tube or cylindrical valves are inefficient and limit the capacity of food product that can be processed through the machine.

The extension and retraction of pump assemblies and mold plate assemblies in the molding machine create exhaust air and excess food product that is difficult to return to the food supply. Typically, this exhaust air can escape like a "burp" from the machine, causing a splatter of food product that can escape the confines of the machine.

SUMMARY OF THE INVENTION

In accordance with the present invention, there is provided a food product molding machine that comprises a plurality of feed chambers configured to pressurize a food product and a molding plate having a cavity. The machine further includes a manifold configured to communicate the food product under pressure from the feed chamber to the cavity of the molding plate. The manifold includes an interior cavity split by an interior wall into a first chamber or passage and a second chamber or passage through the manifold.

In accordance with a further aspect of the present invention, there is provided a method of communicating a food product under pressure through a manifold from a plurality of feed chambers to a mold plate, the method comprising the acts of dividing a supply of food product into a first portion and a second portion; providing the first portion of food product under pressure in a first passage in the manifold associated with one of a first pair of alternating feed chambers simultaneous with providing the second portion of food product under pressure in a second passage in the manifold associated with one of a second pair of alternating feed chambers; and providing the first portion of food product through the first passage of the manifold to the molding plate simultaneous with providing the second portion of food product through the second passage of the manifold to the molding plate.

The present invention relates to a food product molding machine that comprises a series of at least four plunger assemblies. The machine further comprises a series of at least four feed chambers, each of which is configured to receive one of the four plungers. A first and a second plunger assembly operate simultaneously and in alternation with a third and fourth plunger assemblies to force a food product through each of a first and a second passage in a manifold to fill a mold plate.

The present invention relates to a method of pumping a food product to fill a cavity of mold plate using a series of four plunger assemblies, the method comprising the acts of activating a first and second plunger assembly to operate simultaneously to force a food product to fill a cavity of a mold plate; retracting the first and second plunger assemblies to receive a new supply of food product; and activating a third and fourth plunger assembly to operate simultaneously to provide a food product to fill the cavity of the mold plate.

The present invention relates to a food product molding machine that includes a pump assembly configured to provide a supply of food product under pressure to fill a series of cavities of a mold plate. A valve is disposed between the pump assembly and the mold plate. The valve is configured to selectively communicate the supply of food product under pressure from the pump assembly to the cavity of the mold plate. The valve includes a first stationary plate disposed adjacent to a second stationary plate, the first and second stationary plates having a plurality of aligned openings. The first and second stationary plates define a passage extending therebetween. The valve further includes a third plate configured to selectively slide in the passage and operable to limit or control the flow of food product through the plurality of aligned openings in the first and second plates.

The present invention further relates to a method of controlling a supply of food product to fill a cavity of a mold plate, the food product being fed under pressure by a feed arrangement such as two pairs of alternating pump assemblies through a series of four feed chamber assemblies. The method comprises operating one of a first pair of pump assemblies simultaneously with one of a second pair of pump assemblies. A first portion of food product is provided with one of the first pair of pump assemblies through a first feed chamber. A second portion of food product is provided with one of the second pair of pump assemblies through a second feed chamber. A valve is slid in a lateral direction to a first position to selectively communicate the first portion of food product from the first feed chamber simultaneous with the second portion of food product from the second feed chamber. A second of the first pair of pump assemblies is operated simultaneously with a second of the second pair of pump assemblies. A third portion of food product is provided with the second of the first pair of pump assemblies through a third feed chamber. A fourth portion of food product is provided with the second of the second pair of pump assemblies through a fourth feed chamber. The valve is slid in a lateral direction to a second position to selectively communicate the third portion of food product from the third feed chamber simultaneous with the fourth position of food product from the fourth feed chamber.

There is provided a food product molding machine comprising an auger assembly and an auger cover enclosing the auger assembly. The auger assembly is configured to supply food product from a hopper to a feed assembly that moves the food product under pressure through a manifold to a mold plate having a series of cavities. The auger cover includes an opening, which may be in the form of a slot, to receive an exhaust of air and excess food product created during operation of the molding machine. The machine further includes a breather vent assembly mounted to the auger cover. The breather vent assembly includes a wall mounted on a guide. The wall is disposed behind the breather slot to receive the exhaust air and excess food product. The wall is disposed to release the exhaust air to the atmosphere and to return the excess food product to the auger assembly.

DETAILED DESCRIPTION OF THE PREFERRED EMBODIMENTS

Accordingly, the present invention provides a manifold configured to communicate pressurized food product from a feed chamber to a fill area to fill a cavity of a mold plate, such as in a patty molding machine.

The present invention relates to a pressure assembly including a number of pairs of plungers, e.g., two pairs, that are configured to increase the throughput of pressurized food product to fill a cavity of a mold plate, thereby increasing the capacity of the patty molding machine.

The present invention provides a valve configured to selectively communicate a food product fed under pressure from a feed chamber to a manifold connected to a fill area for filling a cavity of a mold plate.

Figure 1:
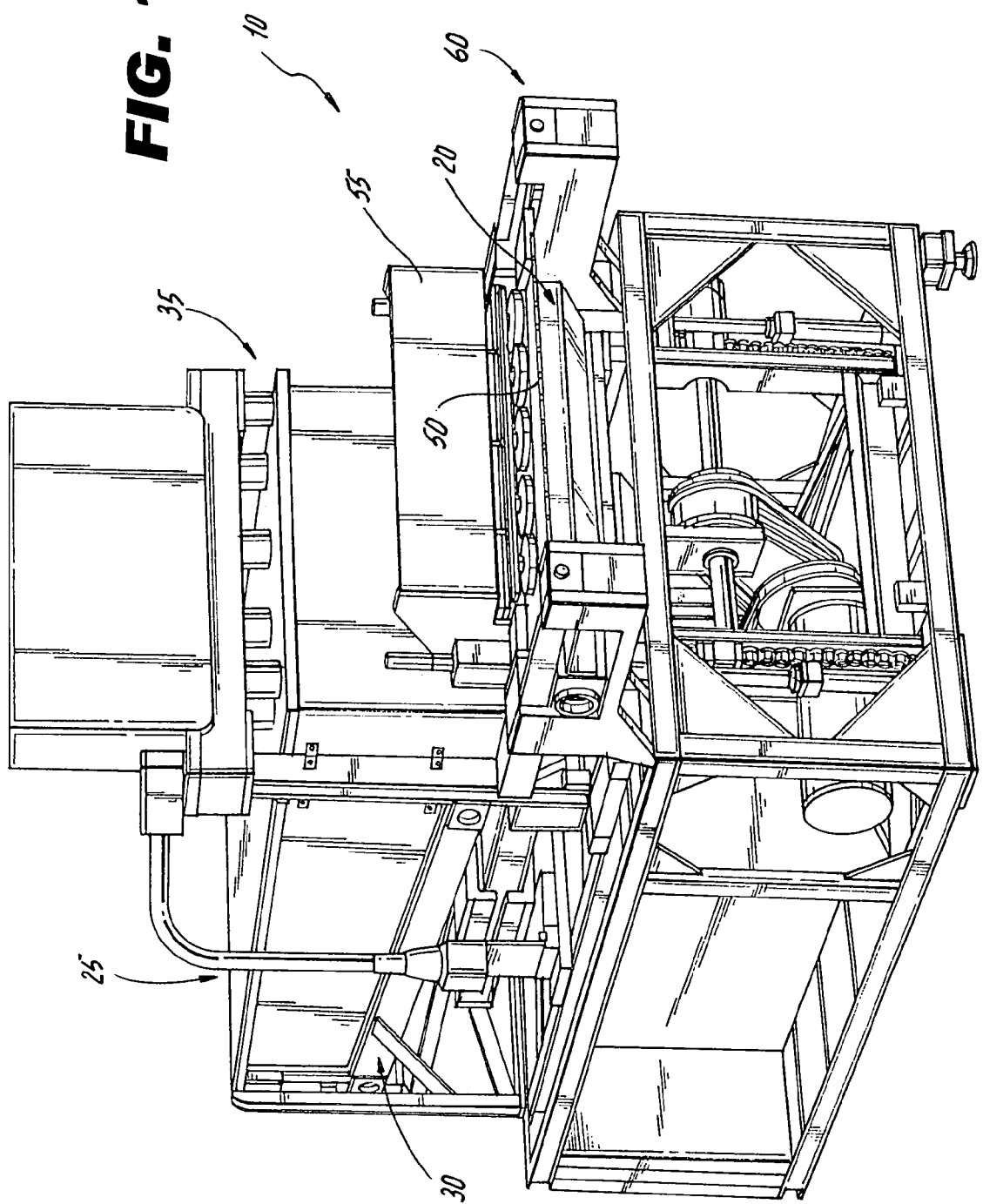
FIG. 1 is a perspective view of one embodiment of a food product molding machine in accordance with the present invention.
Figure 2:
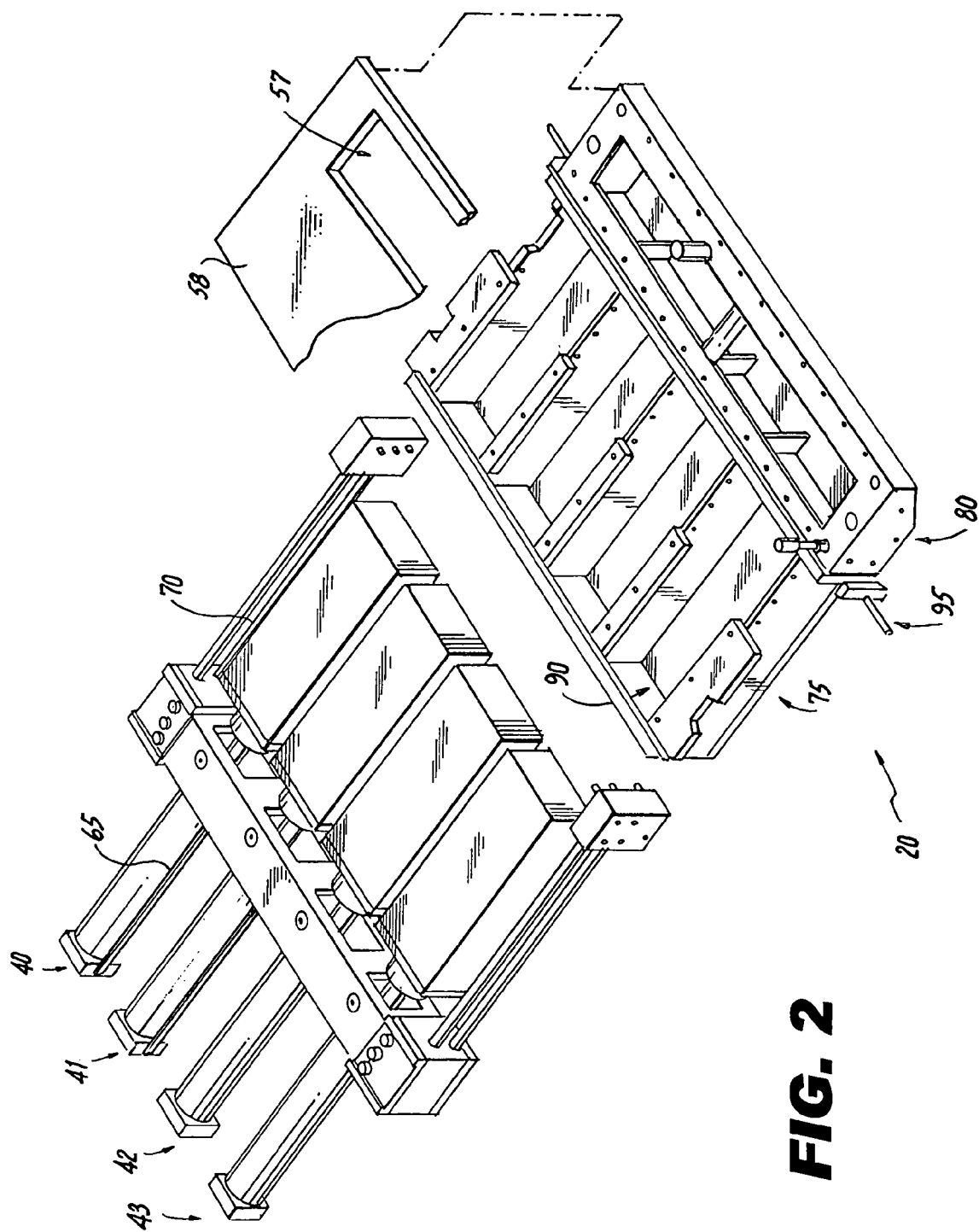
FIG. 2 is a perspective view of a plunger assembly and a feed chamber/manifold assembly incorporated in the machine shown in FIG. 1.
Figure 3:
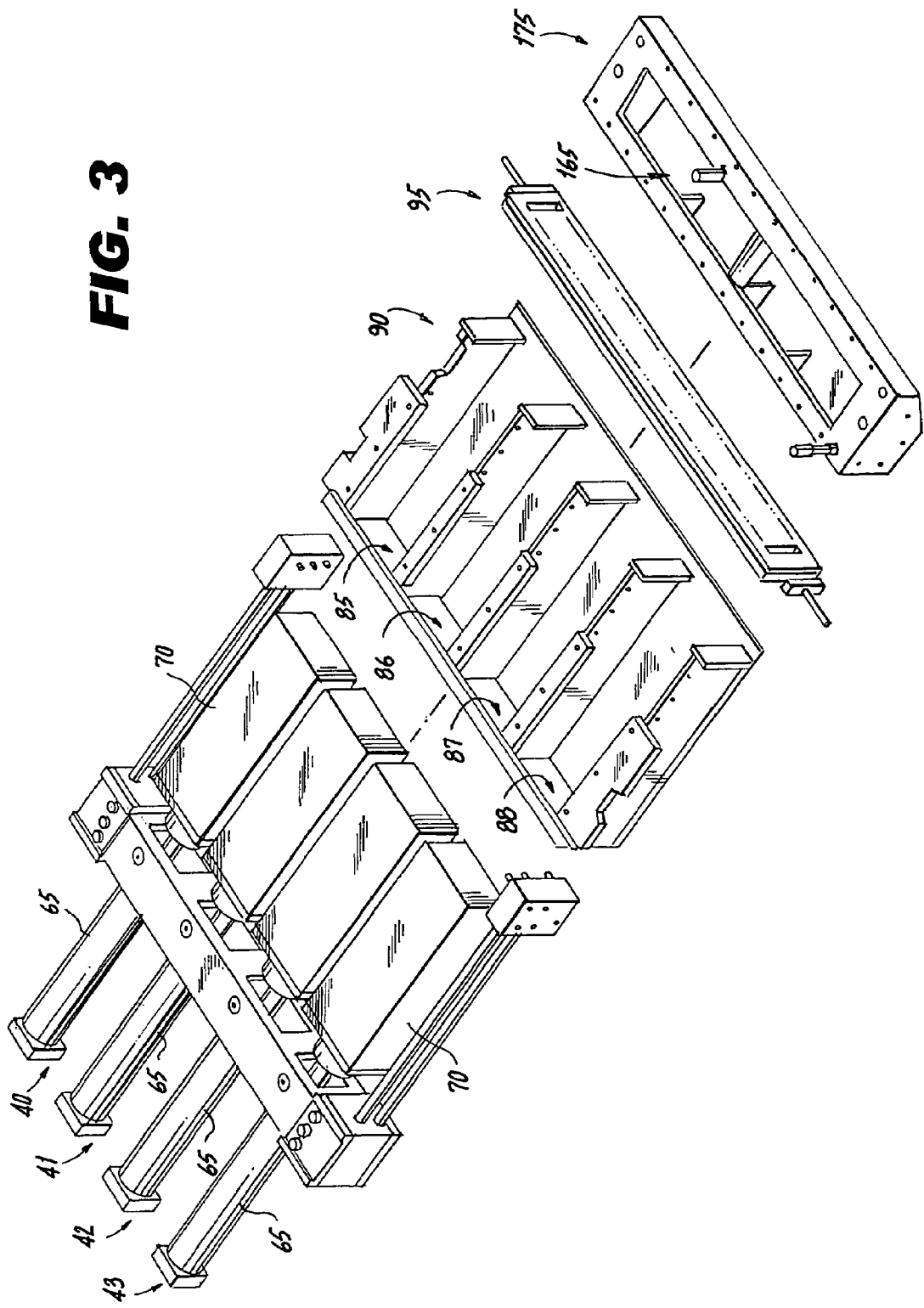
FIG. 3 is a perspective exploded view of the plunger assembly and the feed chamber/manifold assembly of FIG. 2.
Figure 4:
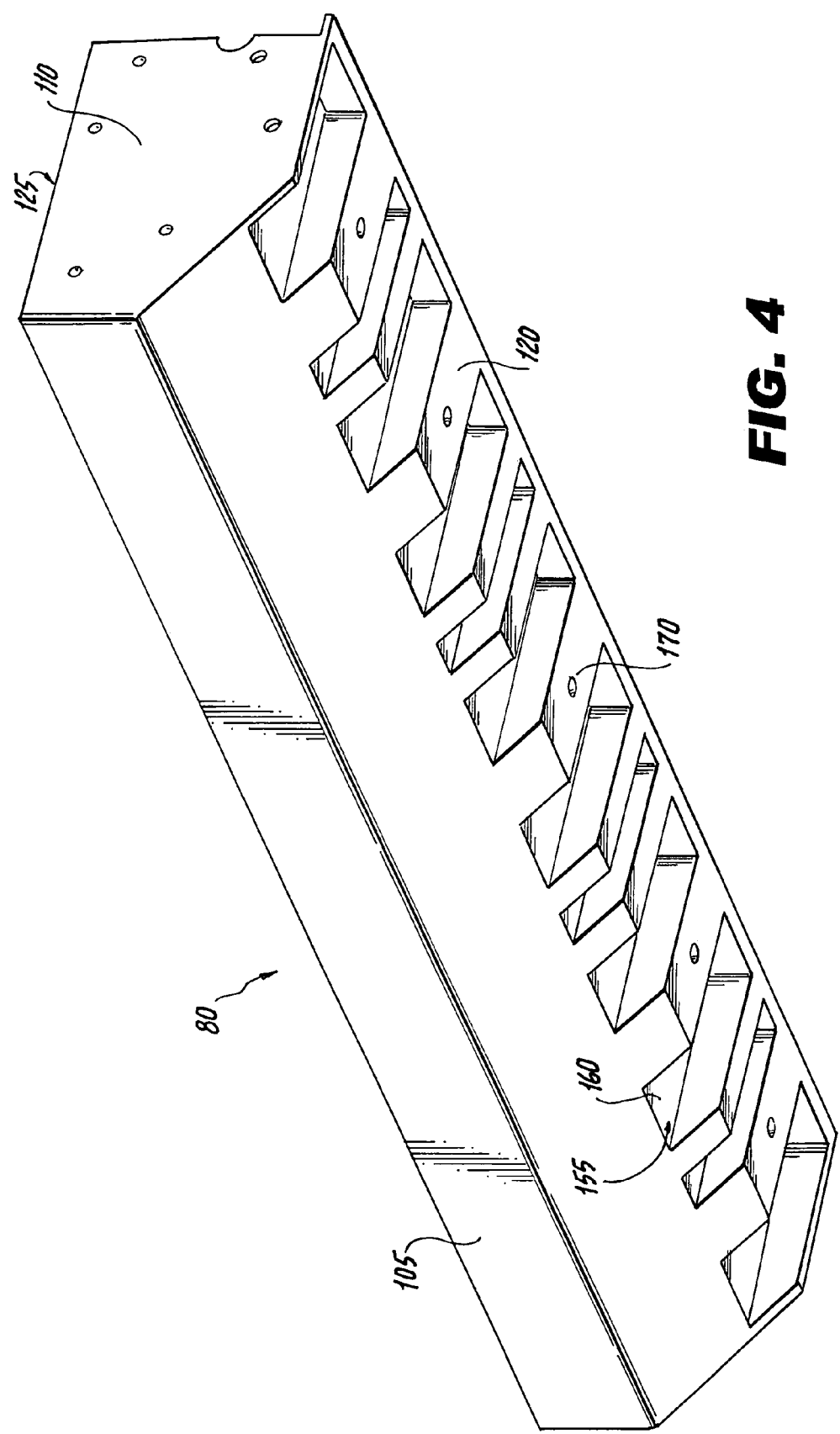
FIG. 4 is a perspective bottom view of the manifold assembly in FIG. 3.
Figure 5:
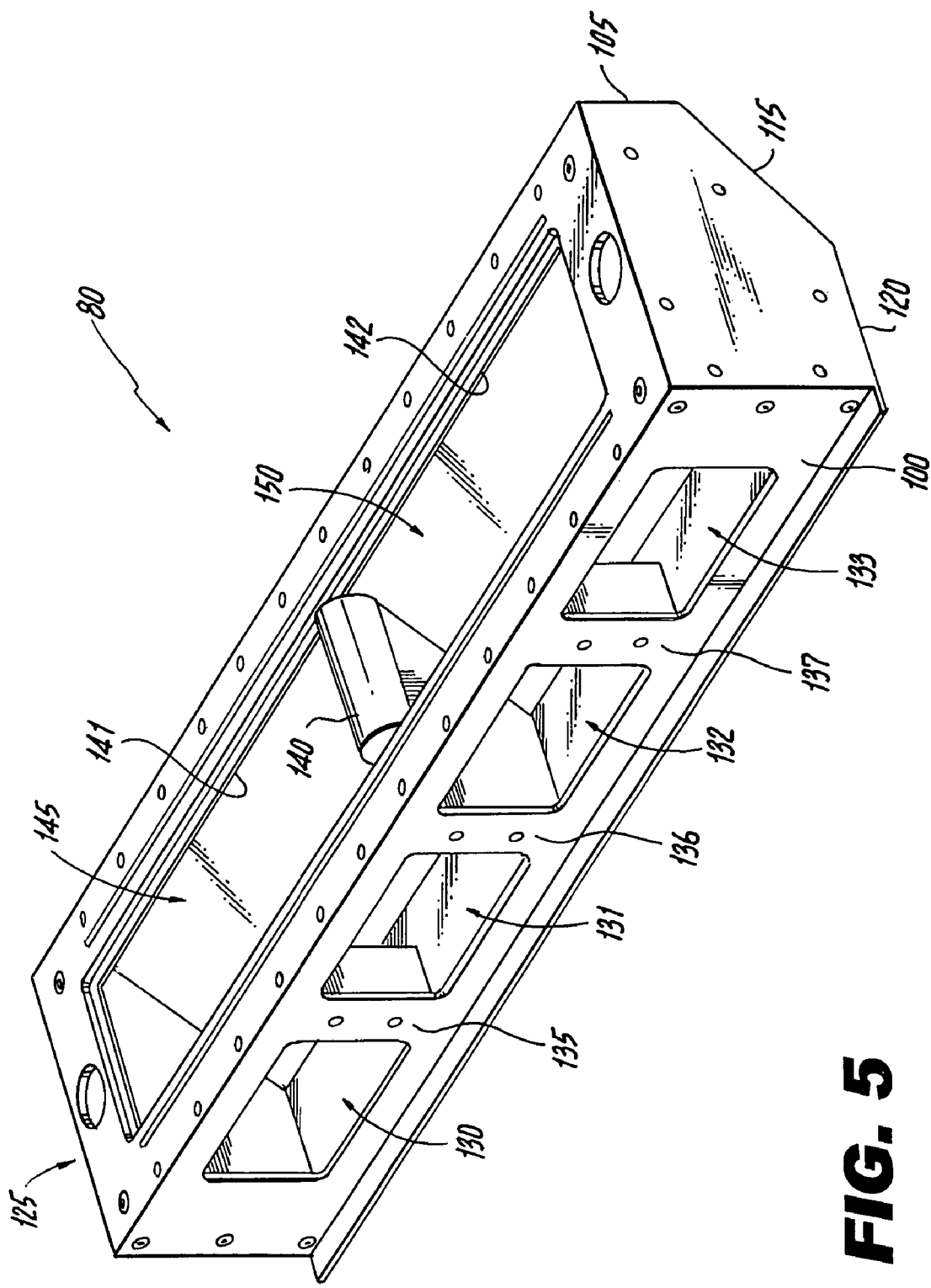
FIG. 5 is a perspective top view of the manifold assembly in FIG. 3.

FIGS. 1-3 show one embodiment of the food product molding machine 10 having a feed chamber/manifold assembly 20 of the present invention. The figures show a multiple plunger pump system. The machine 10 generally includes a food hopper 25, a conveyor assembly 30, and an auger assembly 35 configured to deliver a supply of food product to a pump system. The pump system includes a series of plunger assemblies 40-43 (See FIGS. 2 and 3) configured to pressurize or force the food product through a feed chamber 75/manifold assembly 80 and into a series of cavities of a mold plate 50. The pressure applied by the plunger assemblies 40-43 regulates the compression of the food product in the cavity of the mold plate 50. A knockout assembly 55 separates the formed food product or patty from the mold plate 50.

FIG. 2 shows a detailed perspective view of the plunger assemblies 40-43 and the feed chamber 75/manifold assembly 80 incorporated into machine 10. The feed chamber 75/manifold assembly 80 is disposed to communicate the pressurized flow of food product to a fill area 57 disposed in a fill plate 58 and into the cavity of the mold plate 50. A mold drive system 60 reciprocates mold plate 50 back and forth in alignment with the fill area 57 of the fill plate 58 to receive the pressurized food product into the plurality of cavities in the mold plate 50. After filling the cavities, the mold drive system 60 slides the mold plate 50 outward from alignment with the fill area 57, where the knockout assembly 55 discharges the molded food product from the cavity of the mold plate 50.

FIGS. 2 and 3 show an exploded perspective view of the plunger assemblies 40-43 and the feed chamber 75/manifold assembly 80. Each plunger assembly 40-43 includes a hydraulic drive cylinder assembly 65 configured to reciprocate a respective plunger 70 in a back and forth manner. The type of pump assembly (e.g., screw pumps, plungers, etc.) can vary.

The feed chamber 75/manifold assembly 80 includes a feed chamber assembly 75 and a manifold assembly 80. The feed chamber assembly 75 includes four horizontal feed chambers 85-88 aligned with a respective plunger assembly 40-43. Each plunger assembly 40-43 reciprocates back and forth inside its respective feed chamber 85-88, as shown by the arrows. The reciprocation of the plunger assemblies 40-43 forces a food product under pressure into the manifold assembly 80. The fill plate 58 defines the top of the downstream end of the feed chamber assembly 75 and the top region of the manifold assembly 80. A main assembly plate 90 defines the bottom portion of the feed chamber assembly 75. A shutter-type control valve 95 is disposed between the feed chamber assembly 75 and the manifold assembly 80 to control the flow of food product into and the through the manifold assembly 80.

In one embodiment, each of plunger assemblies 40-43 is paired to extend and retract simultaneously with another one of plunger assemblies 40-43. For example, the inner two plunger assemblies 41 and 42 operate simultaneously in alternation with operation of the outer two plunger assemblies 40 and 43. Of course, the pairing of the plunger assemblies 40-43 (e.g., first and third, second and forth, etc.) can vary.

For example, pump assemblies 41 and 42 extend simultaneously to pressurize the food product through the feed chambers 86 and 87. The valve 95 is slidably adjusted to allow the pressurized flow of food product through the manifold assembly 80 to the cavity of the mold plate 50, while preventing the flow of food product from feed chambers 85 and 88. The plunger assemblies 41 and 42 can delay their extended positions to maintain the pressure on the food product into their cavities of the mold plate 50.

Shortly after the plunger assemblies 41 and 42 exert their maximum pressure to force food product to the mold plate 50, the plunger assemblies 41 and 42 retract or are withdrawn to their start positions to fill the respective feed chambers 86 and 87 with more food product, effectively dropping the pressure in the feed chambers 86 and 87 to zero. This cycle continues as plunger assemblies 40 and 43 extend, slightly before plunger assemblies 41 and 42 retract, to pressurize the food product through the feed chambers 85 and 88. The control valve 95 slidably adjusts to allow the pressurized food product from feed chambers 85 and 88 through the manifold assembly 80, while closing feed chambers 86 and 87. Likewise, the plunger assemblies 40 and 43 withdraw to refill the feed chambers 86 and 87 with more food product, while plunger assemblies 41 and 42 extend slightly before to force food product through the manifold assembly 80. The overlapping operation of the plunger assemblies 40-43 and the adjustments of the control valve 95 operate to provide a substantially uniform flow and constant pressure of food product through each passage 145 and 150 of the manifold assembly 80.

Limit switches and similar control assemblies can be used to control activation of the plunger assemblies 40-43 and control valve 95 with the reciprocation of the mold plate 50 by the mold plate drive system 60.

Figure 6:
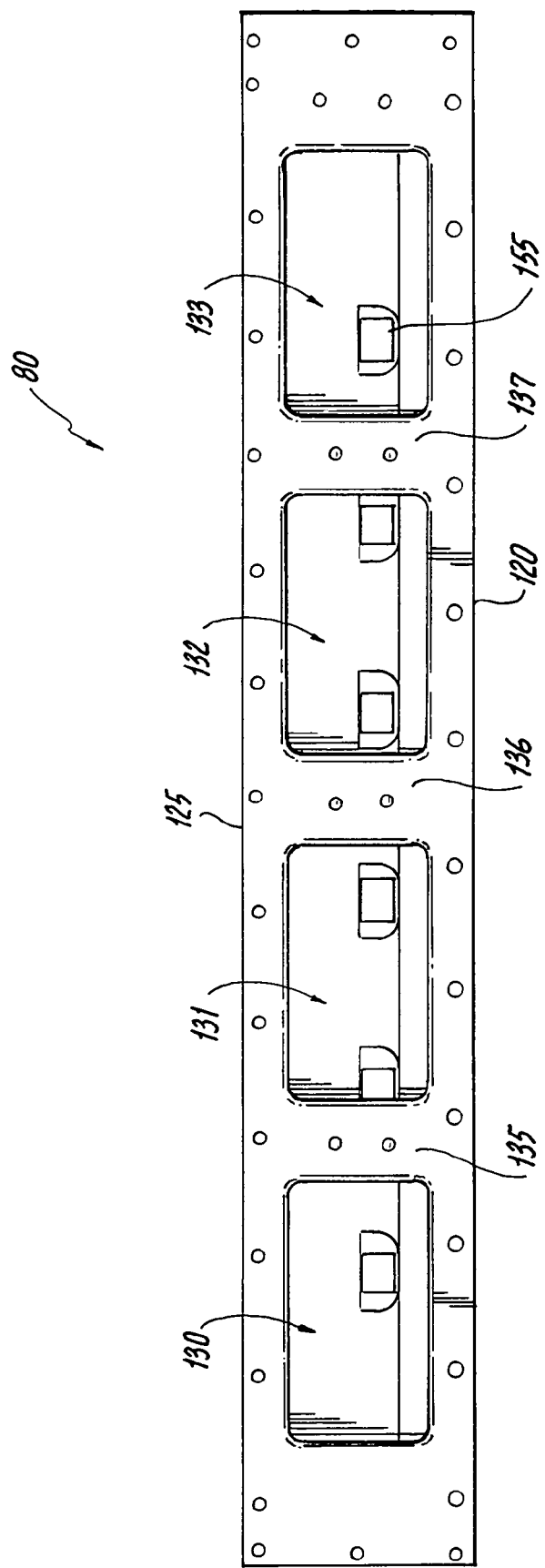
FIG. 6 is a rear elevation view of the manifold assembly in FIG. 3.
Figure 7:
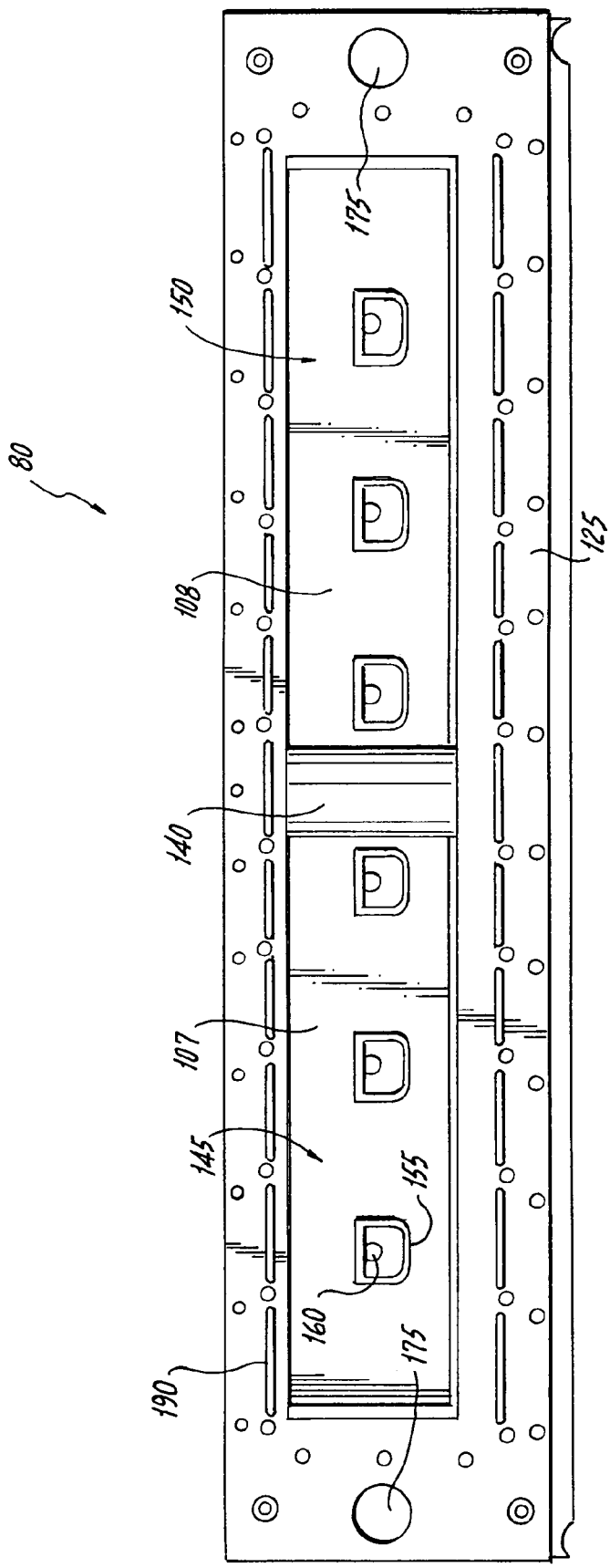
FIG. 7 is a top view of the manifold assembly in FIG. 3.
Figure 8:
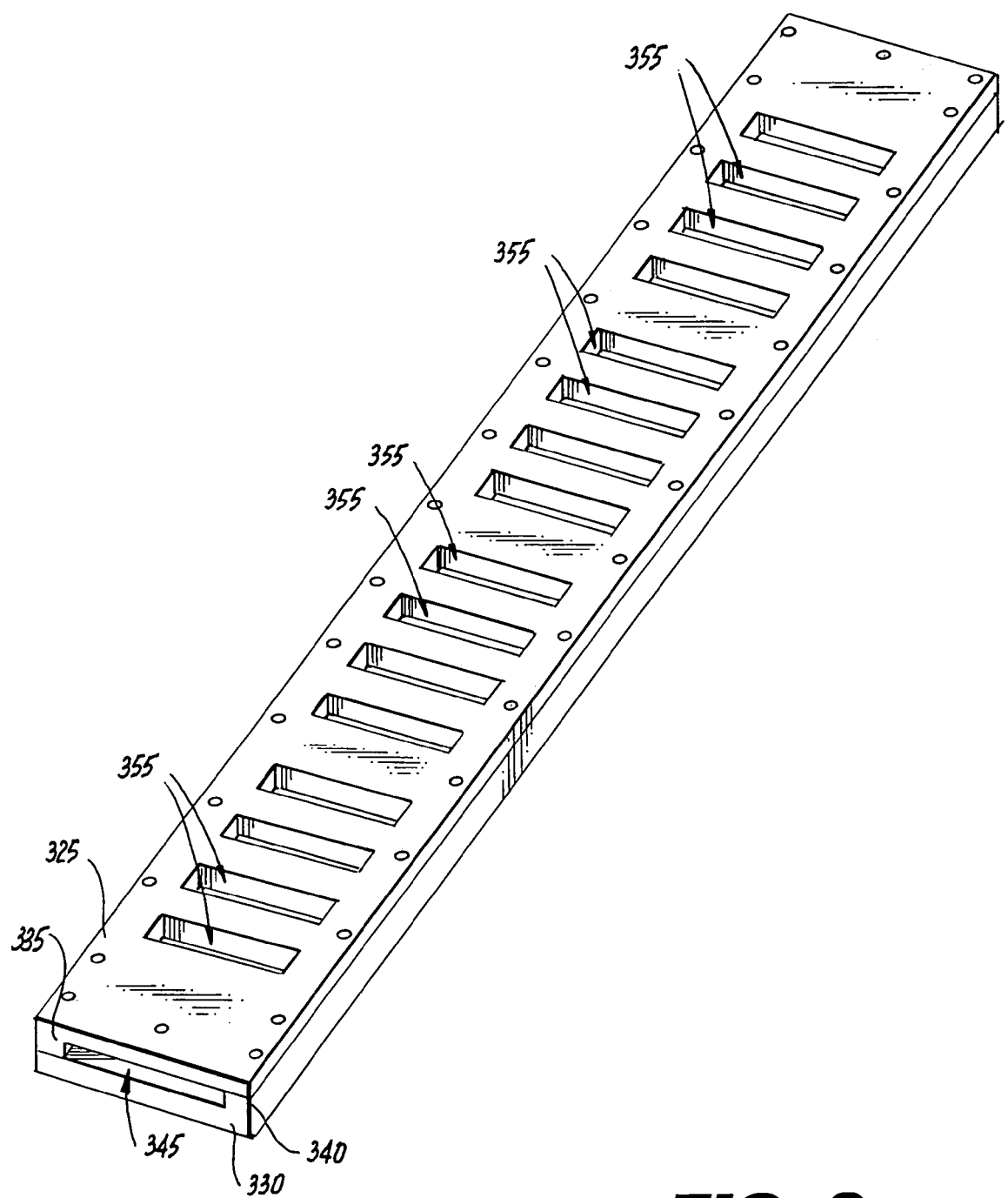
FIG. 8 is a detailed view of a shutter valve assembly shown in FIG. 3.
Figure 9:
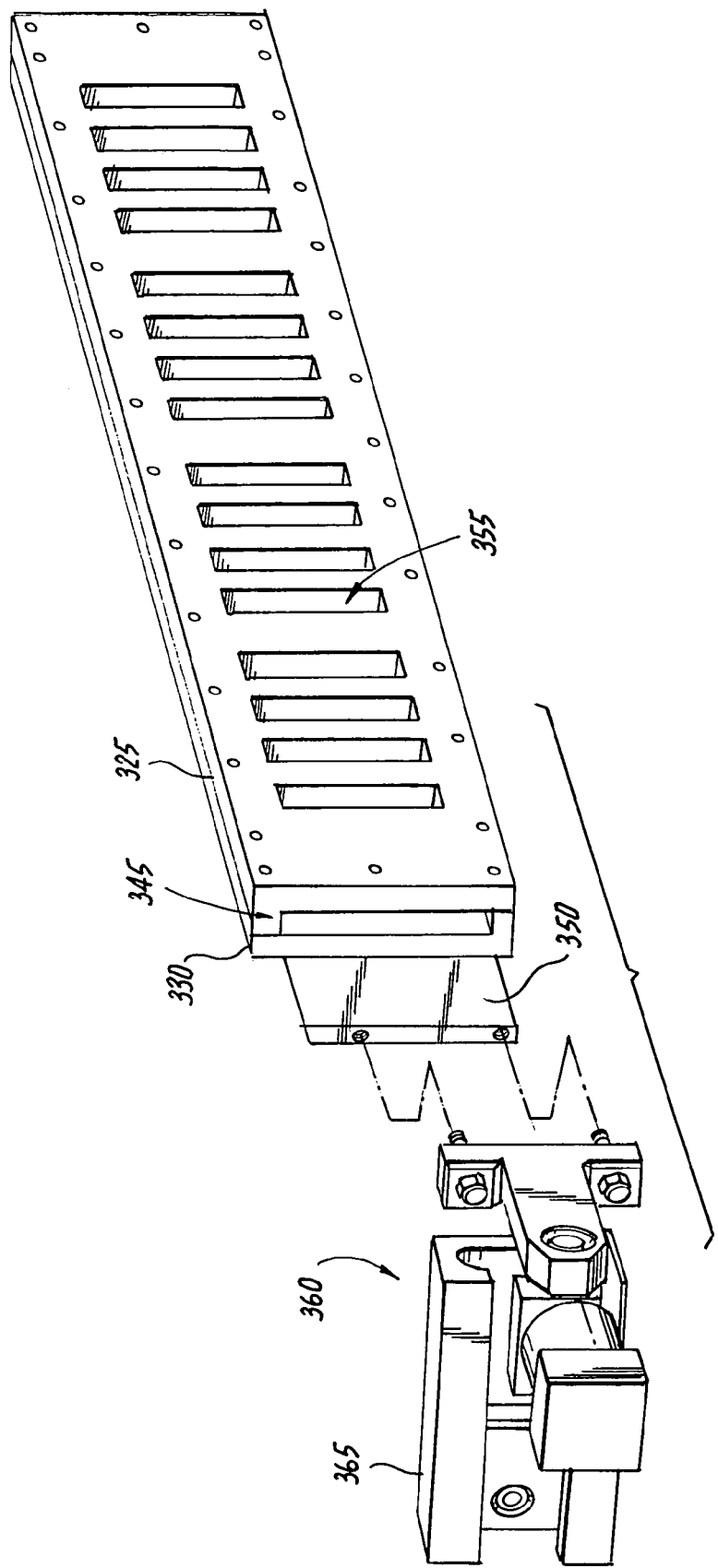
FIG. 9 is a detailed view of a shutter valve assembly shown in FIG. 3.
Figure 10:
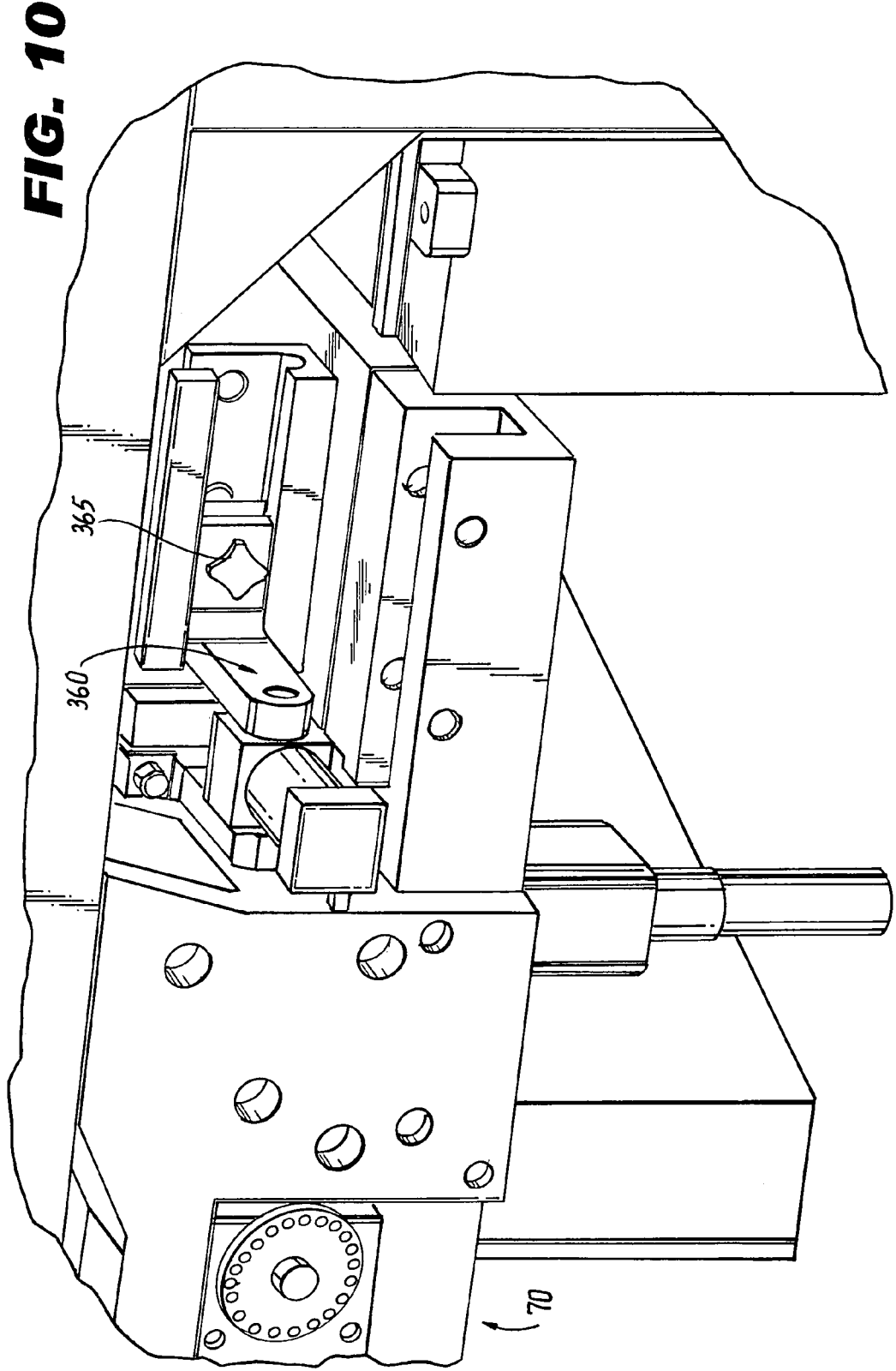
FIG. 10 is a side elevation view of the actuator and shutter valve assembly shown in FIG. 1.
Figure 11:
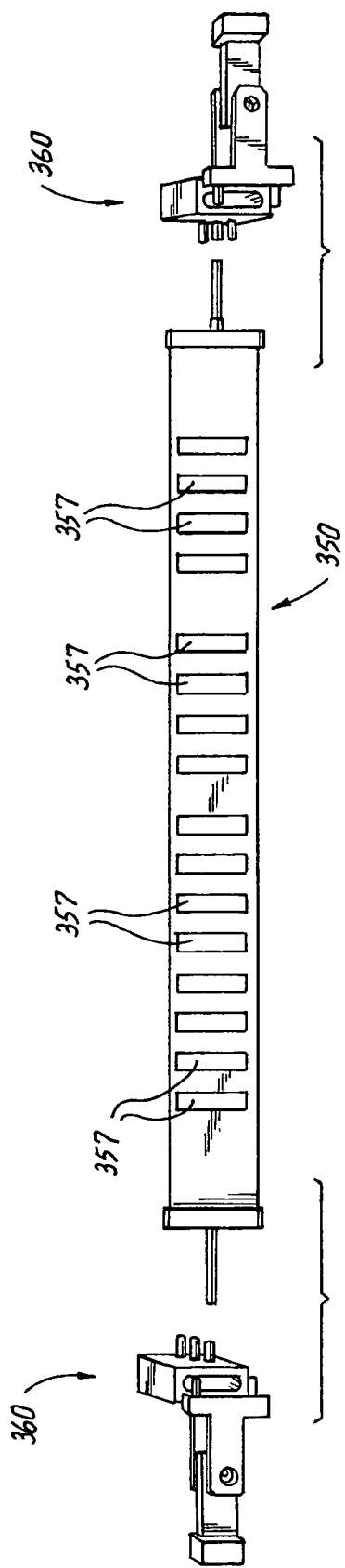
FIG. 11 is an exploded view of the sliding plate of the shutter valve with the first and second plates removed.
Figure 12:
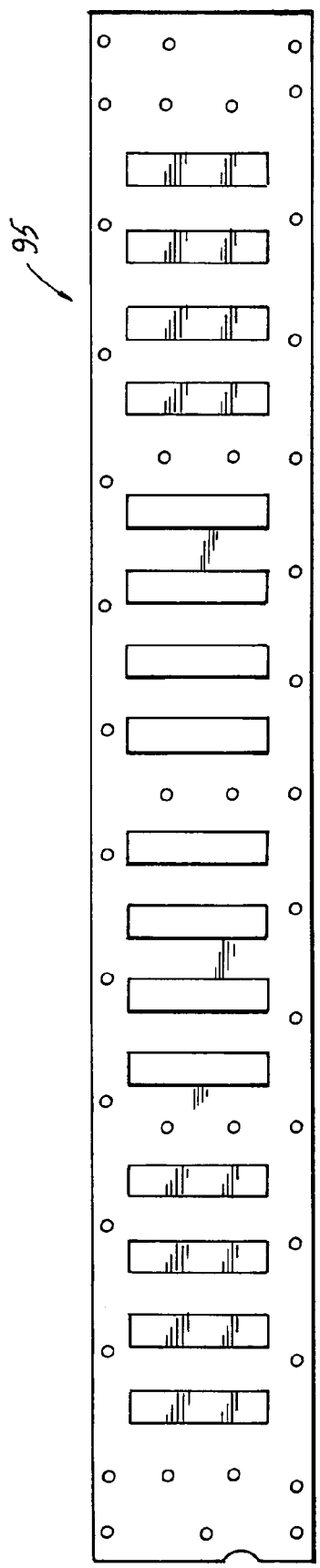
FIG. 12 is a view of the shutter valve at a first position.
Figure 13:
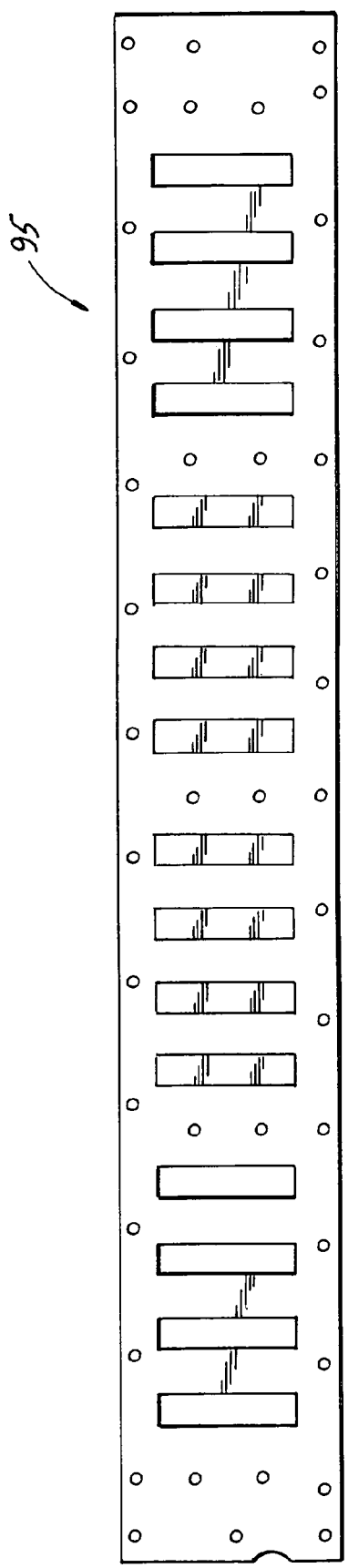
FIG. 13 is a view of the shutter valve at a second position.

FIGS. 4-7 show detailed perspective views of the manifold assembly 80 of FIG. 3. FIG. 6 shows a detailed rear elevation view of the manifold assembly 80. FIG. 7 shows a detailed top view of the manifold assembly 80. The manifold assembly 80 defines the downstream end of the feed chamber assembly 75. The manifold assembly 80 includes a pair of sidewalls 107 and 108, a pair of endwalls 110 and 115, a bottom wall 120 and a top region 125. Rearwall 100 of the manifold assembly 80 includes a series of four inlet ports 130-133 configured to receive a food product under pressure from a respective feed chamber 85-88 of the feed chamber assembly 75. Inlet ports 130-133 are configured to be in alignment with respective feed chambers 85-88 of feed chamber assembly 75. The partitions 135-137 defining the inlet ports 130-133 align with the dividing walls defining each feed chamber 85-88 in the feed chamber assembly 75. The shape and size of the inlet ports 130-133 can vary. Top region 125 includes outlet openings 141-142.

The manifold assembly 80 also includes an interior wall 140. The interior wall 140 is configured to create a first chamber or passage 145 and a second chamber or passage 150 through the manifold assembly 80. In one embodiment, manifold assembly 80 is a cast metal member and interior wall 140 is an integral part of manifold assembly 80 that extends from the dividing wall 136 separating the inner two inlet ports 131 and 132 to the second sidewall 105, and from the bottom wall 120 to the top region 125 of the manifold assembly 80. The thickness of the interior wall 140 can vary. There is a gap at the top of the interior wall 140 to equalize the pressure between the passages 145 and 150. The amount of this gap can vary.

In an embodiment, the first 145 and the second 150 passages define a generally arcuate flow path, by virtue of the shape of sidewall 107 relative to the bottom wall 120 and the sidewall 108, to route material from ports 130, 131 and 132, 133 to respective outlet openings 141, 142. The shape of the cross-sectional area of the first 145 and the second 150 passages can vary. The arcuate cross-sectional shape of each passage 145 and 150 enhances re-direction of the incoming horizontal flow of food product through the ports 130-133 in an upward direction to the fill area 57 through outlet openings 141-142, to fill the cavity of the mold plate 50.

Alternatively, the machine 10 and manifold assembly can be configured such that the manifold assembly directs the incoming horizontal flow of food product in a downward direction through a fill slot to fill a cavity of a mold plate reciprocating under the manifold assembly. The manifold assembly can be configured and aligned to receive a flow of food product from the vertical direction. Likewise, the manifold assembly can be configured and aligned to discharge the pressurized flow of food product in any direction.

The manifold assembly 80 is mounted to the fill plate 58 and the main assembly plate 90 of the machine 10 with fasteners. One embodiment of the manifold assembly 80 includes a plurality of support recesses 155 disposed along the bottom wall 120. The support recesses 155 include openings 160 to receive fasteners coupling a support member 165 disposed in the interior of the manifold assembly 80 to the fill plate 58. The position, shape, and number of support recesses 155, openings 160, support members 165 and fasteners can vary. The bottom wall 120 further includes a plurality of fastener openings 170 configured to receive fasteners coupling the manifold assembly 80 to the stationary main plate assembly 90. The manifold assembly 80 further includes a pair of openings 175 along each endwall 110 and 115 to receive a mold lift assembly 180 of the machine 10. Each endwall 110 and 115 also includes a plurality of openings configured to receive fasteners coupling the manifold assembly 80 to the frame of the machine 10. The top region 125 includes a plurality of recesses 190, each recess 190 configured to receive a plurality of keys (not shown) disposed on the fill plate 58. The keys and recesses 190 aid in positioning and sealing the manifold assembly 80 with the fill plate 58. The number and types of fasteners (e.g., bolts, screws, etc.) can vary.

A preferred manifold assembly 80 is comprised of cast stainless steel, but the composition of the manifold assembly can vary.

In operation, the conveyor assembly 30 provides a supply of food product to the auger assembly 35 (Sec FIG. 1). The auger assembly 35 directs the food product downwardly to the feed chamber assembly (See FIGS. 2 and 3). The pairs of plunger assemblies 40-43 alternate in forcing the food product through the feed chamber assembly 75 and the control valve 95 and into the manifold assembly 80. Referring to FIGS. 4-7, the manifold assembly 80 is split by interior wall 140 such that a first portion of food product is received in the first passage 145 under pressure from one of the first pair of plunger assemblies 40 and 41. Simultaneously, a second portion of food product is received in the second passage 150 under pressure from one of the second pairs of plunger assemblies 42 and 43. The first pair 40 and 41 and second pair 42 and 43 of plunger assemblies alternate operation in forcing the food product into the first 145 and second 150 passages, respectively, of the manifold assembly 80. The first 145 and the second 150 passages communicate the horizontal flow of the first and second portions of food product in an upward direction to respective outlet openings 141, 142, and through fill area 57 in the fill plate 58 to fill a plurality of cavities disposed along the mold plate 50 (See FIGS. 1 and 2). The fill area 57 can contain fill inserts configured for different sizes and shapes of cavities in the mold plate 50. Upon filling the plurality of cavities, the mold drive system 60 slides the cavities of the mold plate 50 such that the knockout assembly 55 discharges the formed food product patties from the mold plate 50.

The split design of the manifold assembly 80 enhances the control and balance of the food product flowing through the wide slot area of the manifold assembly 80 to the cavities of the mold plate 50. The control and balance of the food product is important in providing a uniform and consistent food product patty.

It should be understood that the split manifold system of the present invention may be used in combination with any type of feed system, and is not limited to use with a plunger-type system as shown and described. The feed system of the present invention may incorporate any number of pairs of plunger assemblies that operate such that each plunger in each pair extends and retracts in concert with one plunger of each other pair.

FIGS. 8-13 show a detailed view of the manifold valve 95 of FIG. 3. The manifold valve 95 includes a first plate 325 disposed adjacent to a second plate 330 along their faces. Each plate 325 and 330 includes an extension 335 and 340, respectively, that cooperate to form an opening or passage 345 configured to receive a third plate 350. The first plate 325 includes a plurality of elongated openings 355 aligned with a plurality of similar openings in the second plate 330. The third plate 350 also includes a plurality of elongated openings 357 operable to selectively align with openings 355 of the first 325 and second 330 plates. The third plate 350 is configured to slide in the passage 345 formed between the first 325 and second 330 plates, regulating the flow of food product through the openings 355 in the first plate 325 and the second plate 330.

In one embodiment, the first 325 and second 330 plates include four openings 355 aligned with each of the four horizontally aligned pressure chambers 85-88. In a first position, the third plate 350 is configured to allow the flow of food product from the inner two pressure chambers 86 and 87 through the respective passages 145 and 150 of the manifold assembly 80. In a second position, the third plate 350 is configured to allow the flow of food product from the outer two feed chambers 85 and 88 through the first 145 and second 150 passages, respectively of the manifold assembly 80. The number, size and spacing of the openings in plates 325 and 330 can vary.

An actuator 360 is coupled to one end of the third plate 350 to regulate the slidable position of the third plate 350 relative to the first 325 and the second 330 plates. One embodiment of the actuator 360 includes a hydraulic cylinder assembly operable to slidably adjust the third plate 350 position. The type of actuator (e.g., mechanical, manual, hydraulic, etc.) can vary.

To remove the third plate 350 from the manifold valve 95, the actuator includes a mount bracket 365 configured to allow an operator to slide the actuator 360 out of the way for removal of the third plate 350. The actuator 360 can be disposed on either end or both ends of the third plate 350. The actuator 360 can be configured to push or pull the third plate 350 to the desired position relative to the first 325 and second 330 plates of the manifold valve 95. The alignment and size of the openings of the third plate 350 and the first 325 and second 330 plates of the manifold valve 95 and the stroke length can vary.

It can thus be appreciated that third plate 350 functions as a control member to selectively open or close certain openings 355 of first plate 325.

In operation, food product is fed under pressure by two pairs of alternating plunger assemblies 40-43 through a series of four feed chamber assemblies 85-88. One of a first pair of pump assemblies 40 and 41 operates simultaneous with one of a second pair of pump assemblies 42 and 43, to provide a first portion and a second portion of food product through feed chambers 85-88 respectively. The actuator 360 selectively slides the third plate 350 of manifold valve 95 in a lateral direction toward a first position (See FIG. 13) to selectively communicate the first position of food product from feed chamber 86 simultaneous with the second portion of food product from feed chamber 87 through the respective passage 145 and 150 in the manifold assembly 80. In this position, third plate 350 blocks the first plate openings 355 in alignment with feed chambers 85 and 88. The second of the first pair of pump assemblies 40 and 41 operates simultaneous with a second of the second pair of pump assemblies 42 and 43 to provide a third portion and fourth portion of food product through feed chambers 85 and 88 respectively. The actuator 360 selectively slides the manifold valve 95 in a lateral direction toward a second position (See FIG. 12) to selectively communicate the third portion of food product from the feed chambers 86 simultaneous with the fourth portion of food product from feed chamber 87 through the first 145 and second 150 passages of the manifold assembly 80. In this position, third plate 350 blocks the first plate openings 355 in alignment with feed chambers 85 and 88. Thereafter, the cyclic operation of the pump assemblies 40-43 and the actuator 360 and manifold valve 95 work continuously to provide a constant pressure and uniform flow of pressurized food product through the manifold assembly 80 to the reciprocating mold plate 50.

The inter-control of the activation of the plunger assemblies 40-43 and respective manifold valve 95 and mold plate drive system 60 can include pressure limit switches and various controllers known in the art.

While manifold valve 95 is shown and described as having two stationary plates and one control plate therebetween, it is understood that the same result can be achieved with a single stationary plate and an adjacent movable plate. It is also understood that both of the plates can be movable, and that the valve components may take a form other than the plate members as shown and described.

A breather plate and a mold cover (not shown) are mounted above the fill plate opening 57 of the fill plate 58. The reciprocating mold plate moves in a space defined between the breather plate and the fill plate 58. The mold cover encloses the breather plate. As the mold plate receives the pressurized food product through the fill opening 57 in the fill plate 58, the breather plate includes a plurality of passages configured to communicate the exhaust air and excess food product toward the auger assembly 25. This exhaust air and excess food product is retained underneath the mold cover as the mold drive system 60 reciprocates the mold plate 50 to and from a fill position. The breather plate includes a plurality of passages or slots configured to communicate this exhaust air and excess food product toward the auger assembly 25.

Figure 14:
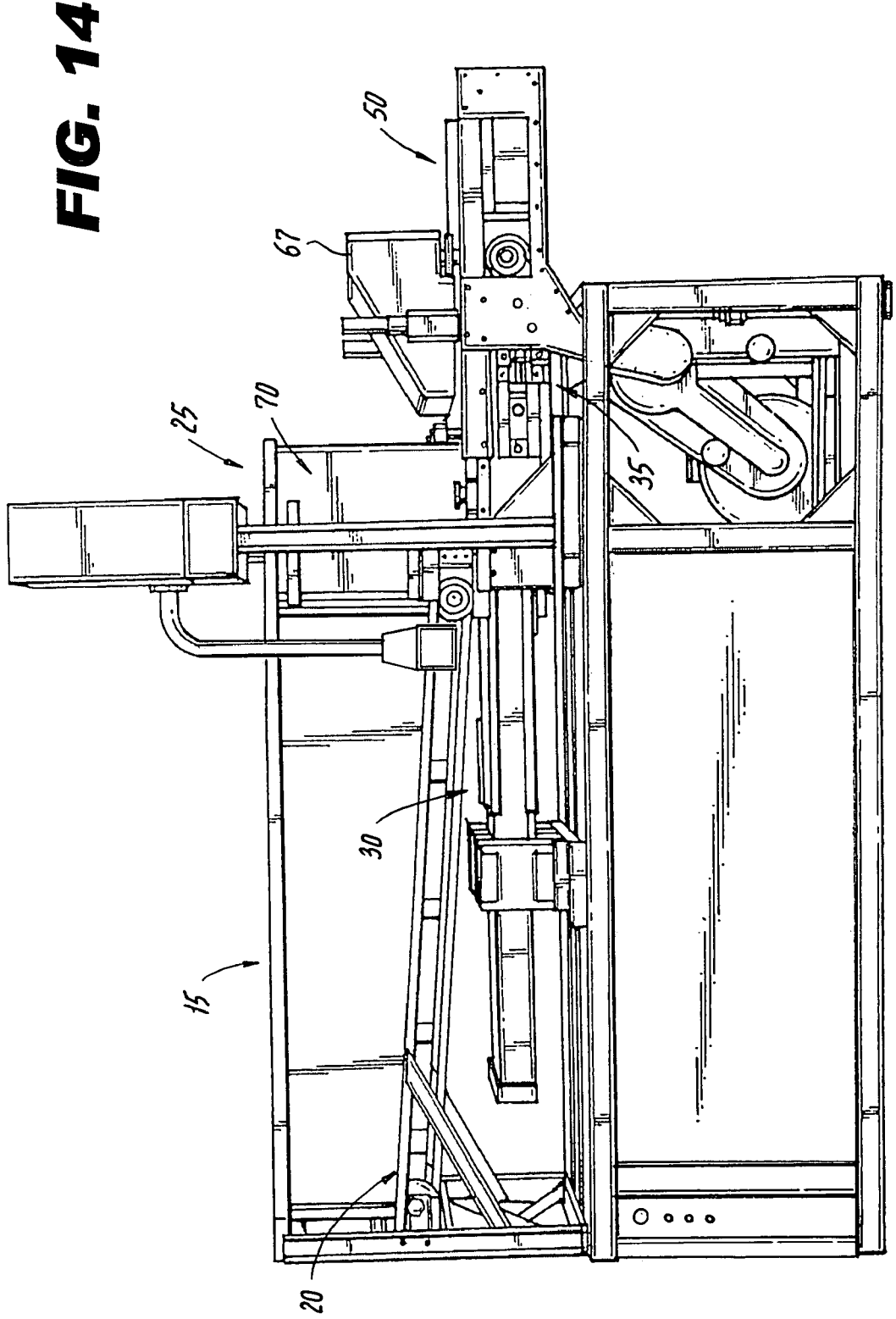
FIG. 14 is a side elevation of the machine shown in FIG. 1.
Figure 15:
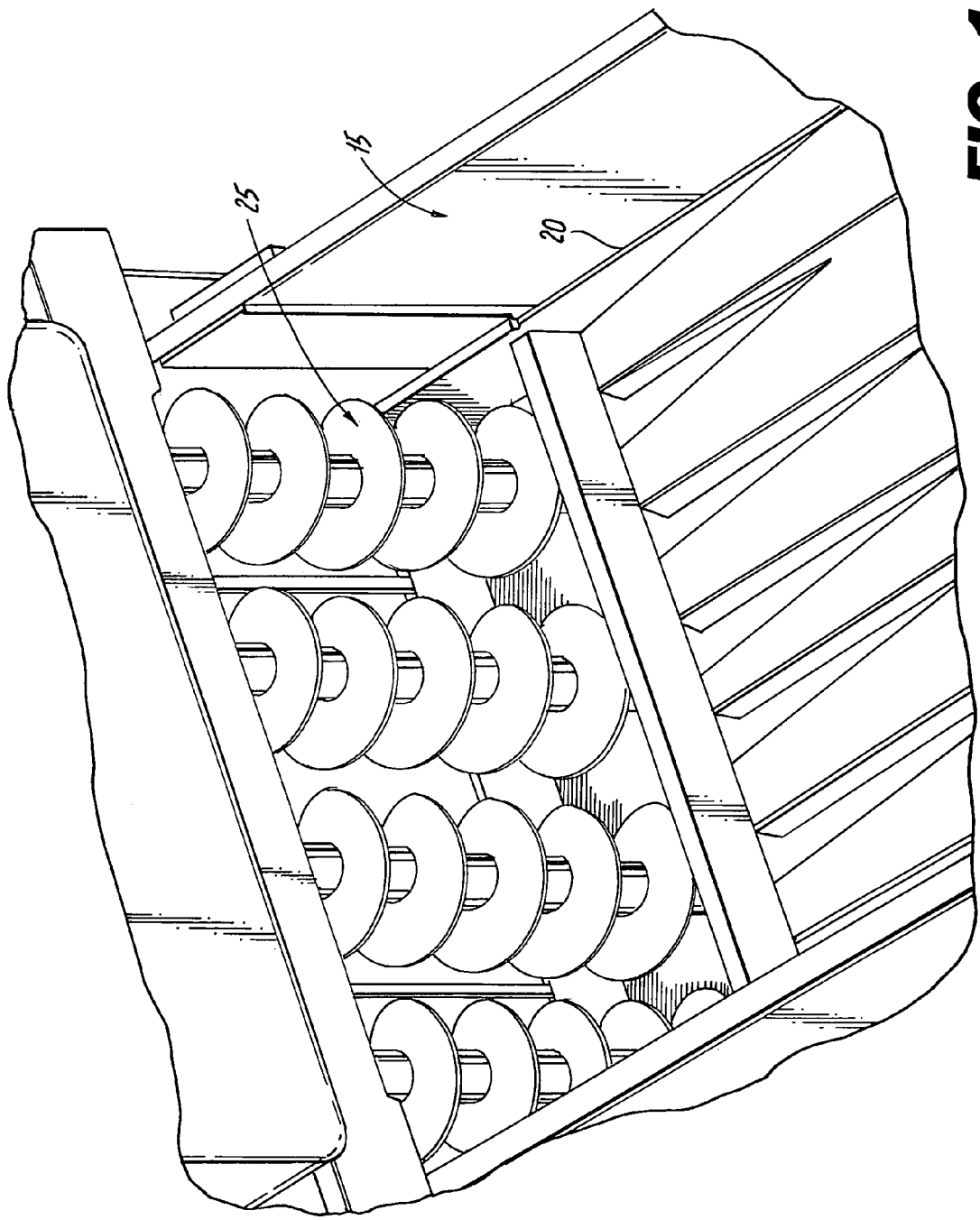
FIG. 15 is a detailed perspective view of the auger assembly and conveyer assembly incorporated in the feed product molding machine of FIG. 1.
Figure 16:
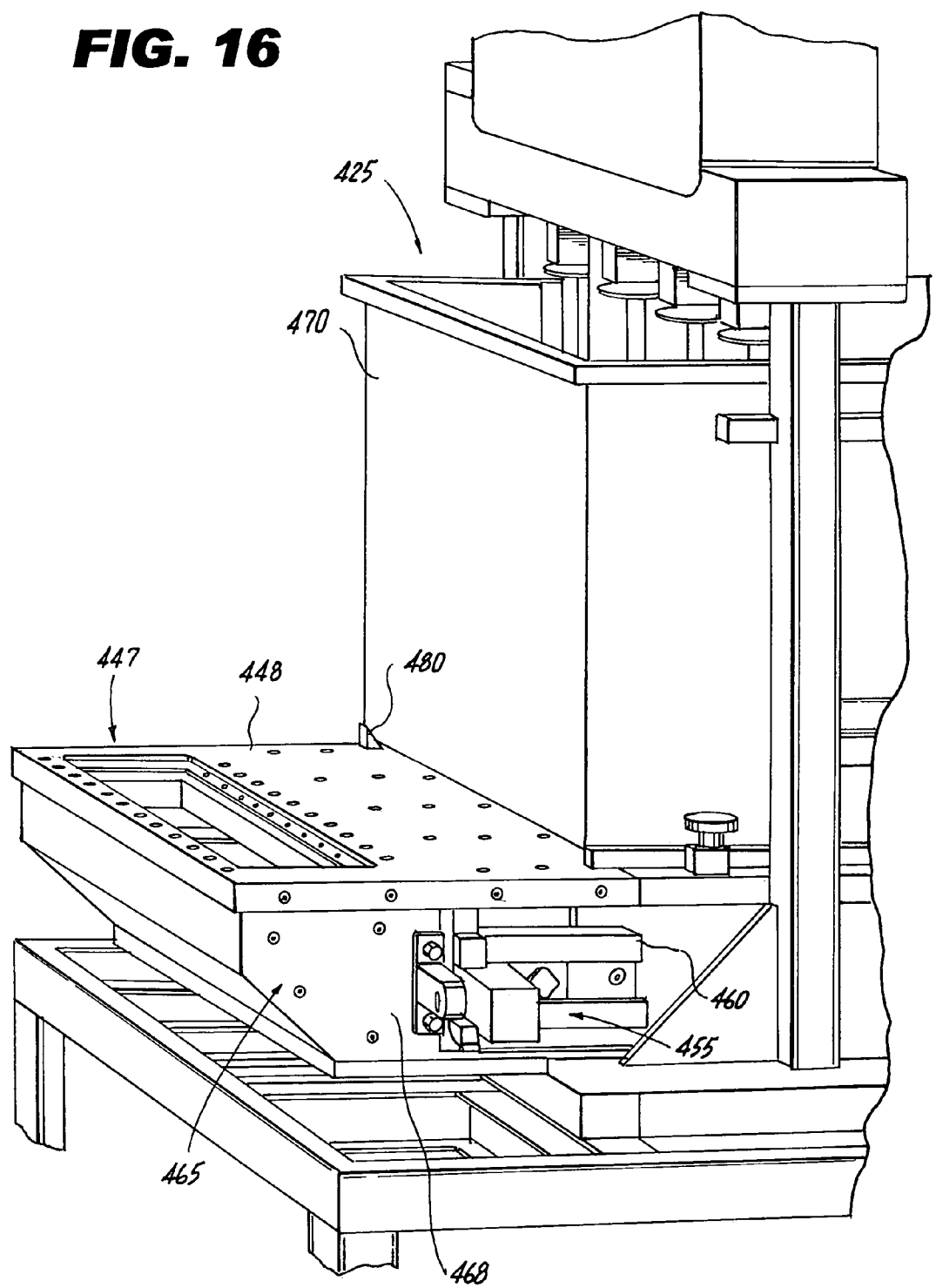
FIG. 16 is a detailed perspective view of the auger assembly in FIG. 1 with the knockout assembly, the mold plate and the mold plate drive system removed.

Referring to FIGS. 14-16, the auger assembly 25 includes an auger cover 70 generally enclosing the auger assembly 25. The auger assembly 25 drives the food product supplied by the conveyor assembly 20 in a downward direction toward the feed chamber assembly 75 of the machine 10. The auger cover 70 is mounted to extend over the feed chamber assembly 75 and partially extend over a rear portion of the fill plate 58.

As shown in FIG. 16, the auger assembly 425 regulates the supply of food product to a pump system. The feed chamber/manifold assembly 20 (FIG. 2) includes a manifold valve 455, a feed chamber assembly 460, and a manifold assembly 465 configured to provide a pressurized flow of food product from the plunger assembly 40-43 (FIGS. 2-3) to a fill slot 447 disposed in a fill plate 448 defining the downstream end of the feed chamber assembly 460 and manifold assembly 465.

The fill plate 448 defines the top of the downstream end of the feed chamber assembly 460 and the manifold assembly 465. A main assembly plate 468 defines the bottom of the upstream portion of the feed chamber assembly 460 and the manifold assembly 465. The manifold valve 455 is disposed to control the flow of food product from a feed chamber assembly 460 through a manifold assembly 465. The manifold assembly 465 generally defines the downstream end of the feed chamber assembly 460.

A breather plate and a mold cover (not shown) are mounted above the fill slot 447 of the fill plate 448. The reciprocating mold plate 50 moves in a space defined between the breather plate and the fill plate 447. The mold cover encloses the breather plate. As the mold plate receives the pressurized food product through the fill slot 447 in the fill plate 48, the breather plate includes a plurality of passages configured to communicate the exhaust air and excess food product toward the auger assembly 425. This exhaust air and excess food product is retained underneath the mold cover as the mold drive system 50 reciprocates the mold plate to and from a fill position. The breather plate includes a plurality of passages or slots configured to communicate this exhaust air and excess food product toward the auger assembly 425.

Referring to FIG. 16, the auger assembly 425 includes an auger cover 470 generally enclosing the auger assembly 425. The auger assembly 425 drives the food product supplied by the conveyor assembly in a downward direction toward the feed chamber assembly 460. The auger cover 470 is mounted to extend over the feed chamber assembly 460 and partially extend over a rear portion of the fill plate 448.

As shown in FIG. 16, a breather vent assembly 475 includes a breather slot 480 that receives the vented exhaust air and excess food product from the breather plate. In one embodiment, the breather vent assembly 475 lifts the auger vent 470 to create the breather slot 480. Alternatively, the auger vent can be cut or formed to include the breather slot 480. The breather slot 480 is configured to receive this exhaust air and excess food product into the auger cover 470. The breather slot 480 is shown rectangular shaped and generally extends the lateral width of the auger cover 470. The shape (e.g., oval, triangular, etc.) and size of the breather slot 480 can vary. Alternatively, the breather slot 480 can include a plurality of individual slots to receive the exhaust air and excess food product.

As shown in FIGS. 17-24, a breather vent assembly 475 includes a breather slot 480 that receives the vented exhaust air and excess food product from the breather plate. Alternatively, the auger vent can be cut or formed to include the breather slot 480. The breather slot 480 is configured to receive this exhaust air and excess food product into the auger cover 70. The breather slot 480 is shown rectangular shaped and generally extends the lateral width of the auger cover 70. The shape (e.g., oval, triangular, etc.) and size of the breather slot 480 can vary. Alternatively, the breather slot 480 can include a plurality of individual slots to receive the exhaust air and excess food product.

Figure 17:
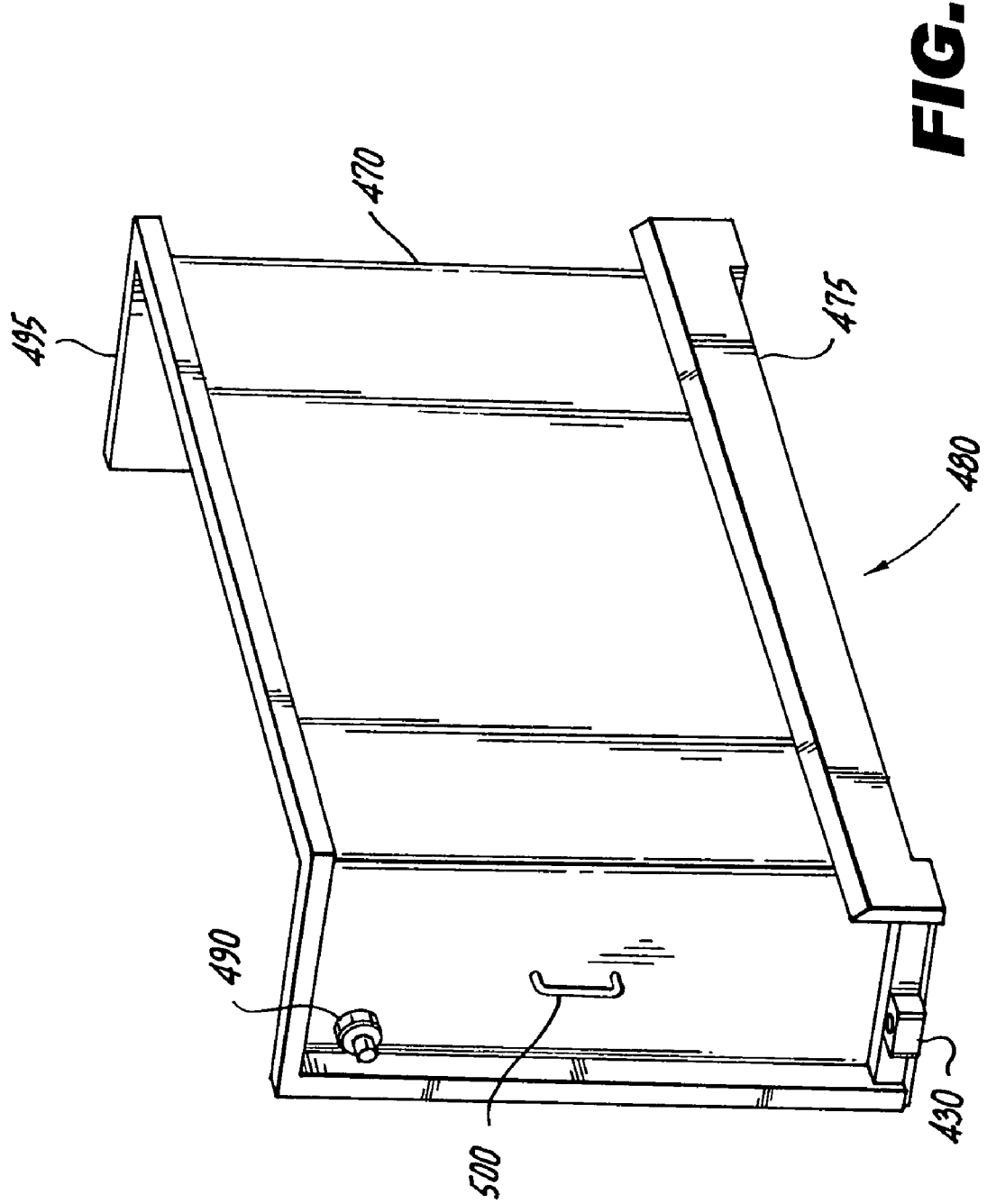
FIG. 17 is a detailed perspective front view of the breather vent assembly and auger cover as shown in FIG. 16.
Figure 18:
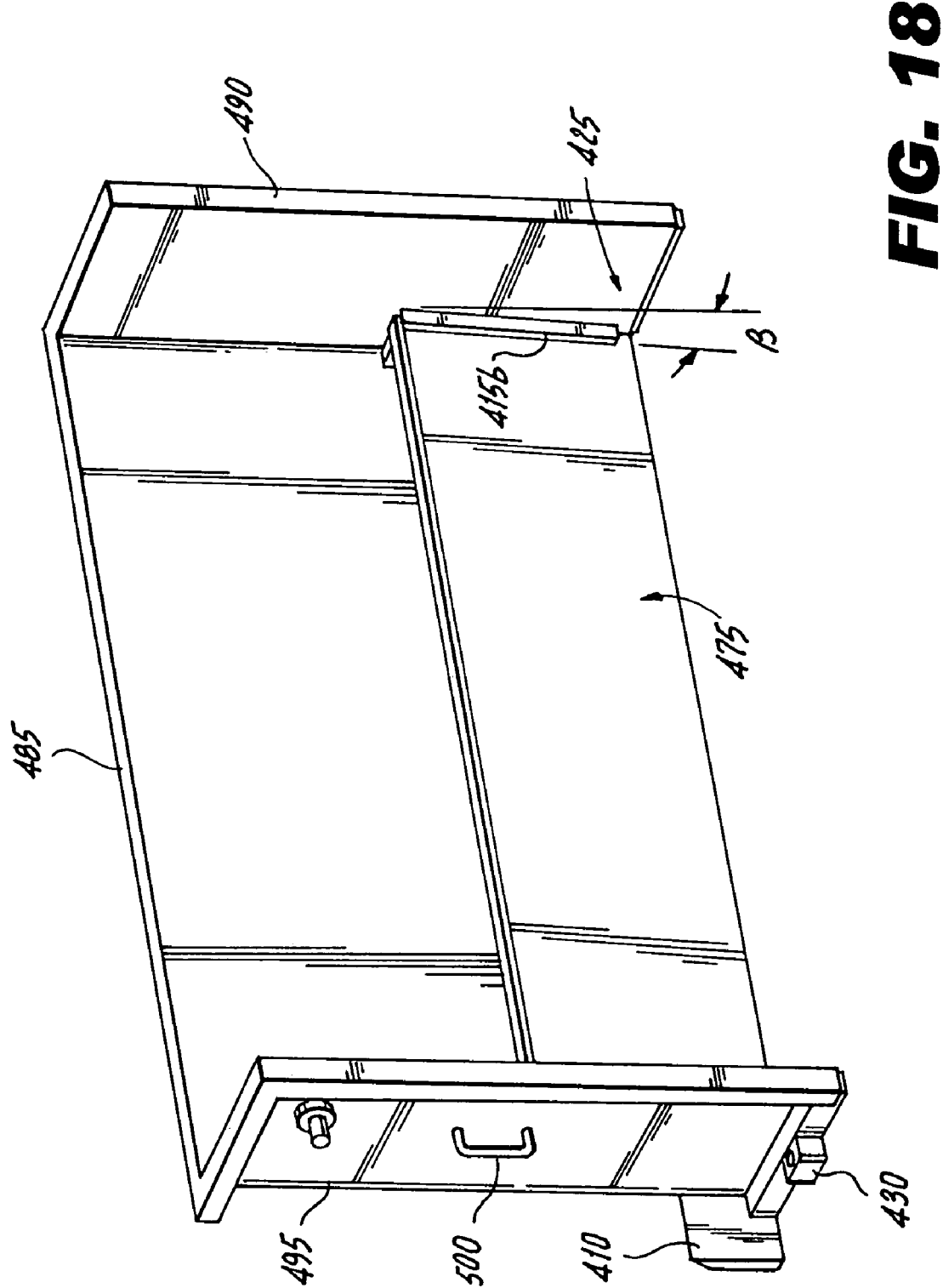
FIG. 18 is a detailed perspective view of the breather vent assembly and auger cover as shown in FIG. 16.
Figure 19:
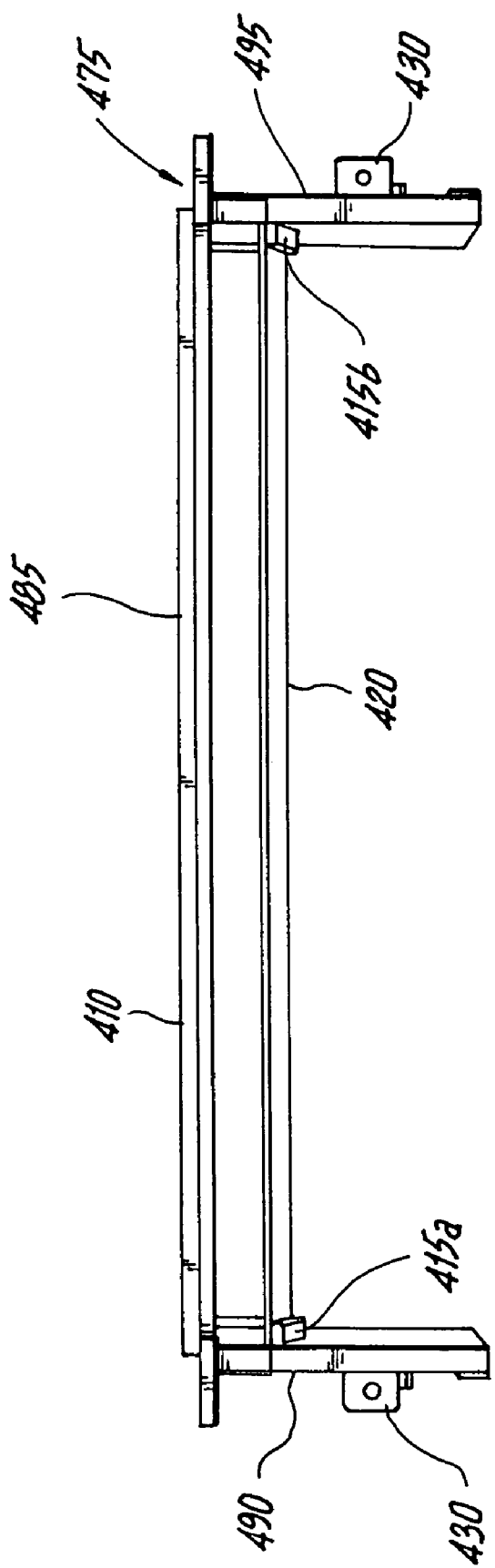
FIG. 19 is a detailed bottom view of the breather vent assembly and auger cover as shown in FIG. 16.

FIGS. 17-24 show detailed views of the breather vent assembly 475 configured with the auger cover 470. FIG. 17 shows a perspective view from the front of the auger cover 70. FIG. 18 shows a perspective view from the rear of the auger cover 470. FIG. 19 shows a bottom view of the auger cover 470. The breather vent assembly 475 is configured with the auger cover 70 to exhaust the air to the atmosphere, while returning the excess food product to the food product supply in the auger assembly 25. The auger cover 70 generally includes a front panel 485 and a pair of side panels 490 and 495. The breather slot 480 is disposed toward the bottom of the front panel 485. The composition of the auger cover 70 can vary. The auger cover 70 further includes a pair of handles 500 mounted on each side of the auger cover 70 for handling the auger cover 70 and breather vent assembly 475.

The breather vent assembly 475 includes a lower panel 410 to form the breather slot 480. The breather vent assembly 475 further includes a pair of guides 415*a* and 415*b* and a breather vent wall 420 mounted in the interior of the auger cover 70. The guides 415*a* and 415*b* and the breather vent wall 420 generally extend downward toward the top plate 58. The guides 415*a* and 415*b* mount the breather vent wall 420 to the side panels 490 and 495 of the auger cover 70. The height of the vent wall 420 generally extends above the operating level of food product supplied in the auger assembly 25. The lower edge of breather vent wall 420 is in contact with the upper surface of fill plate 58, to ensure that air and excess food product is routed upwardly through the baffle defined by breather vent wall 420 in combination with the front panel 485.

The breather vent assembly 475 can further include a mounting bracket 430 to mount the assembly 475 to the fill plate 58. The breather vent assembly 475 can include fasteners (e.g., bolts, screws, weld, etc.) to mount to the auger cover 70. Alternatively, the breather vent assembly 475 can be integrated with the auger cover 70.

Figure 20:
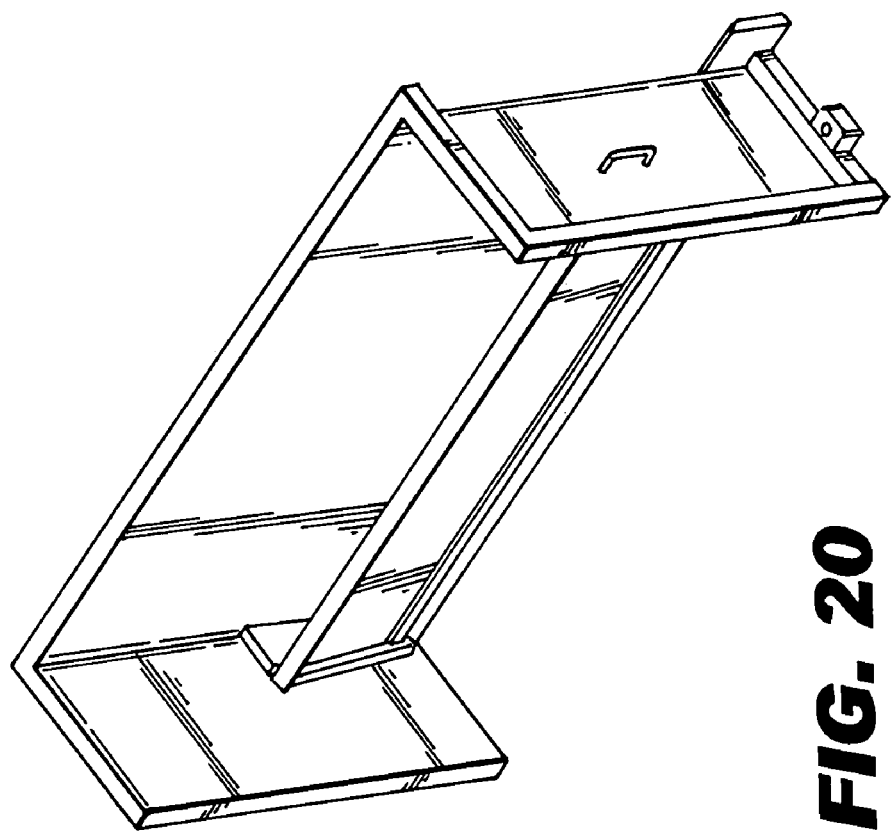
FIG. 20 is a detailed perspective view of the breather vent assembly and auger cover as shown in FIG. 16.

FIG. 20 shows the removable vent wall. The vent only is removable for cleanup purposes only.

Figure 21:
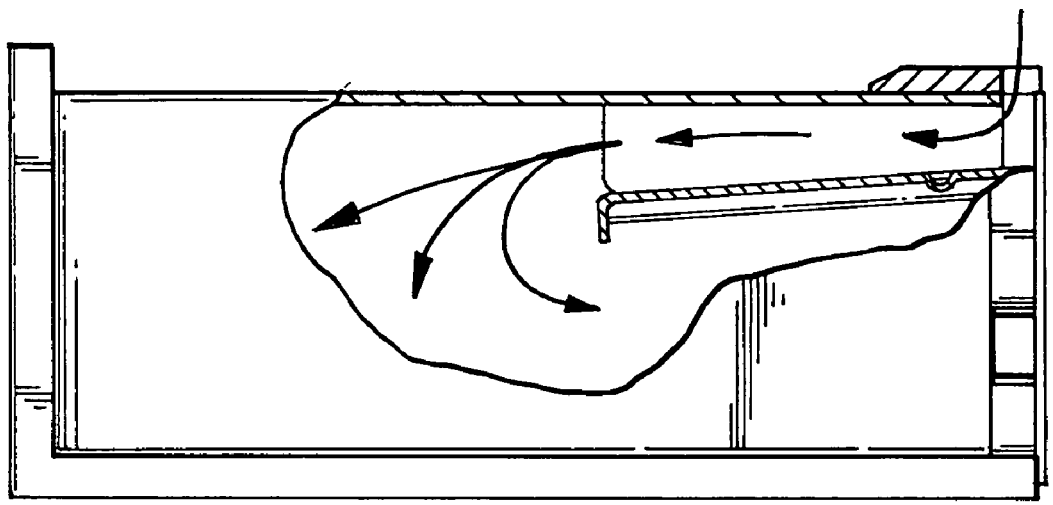
FIG. 21 is a side view of the breather vent assembly and auger cover as shown in FIG. 20.

FIG. 21 shows a side view of FIG. 20 in which the arrows show how the air and product flow.

Figure 22:
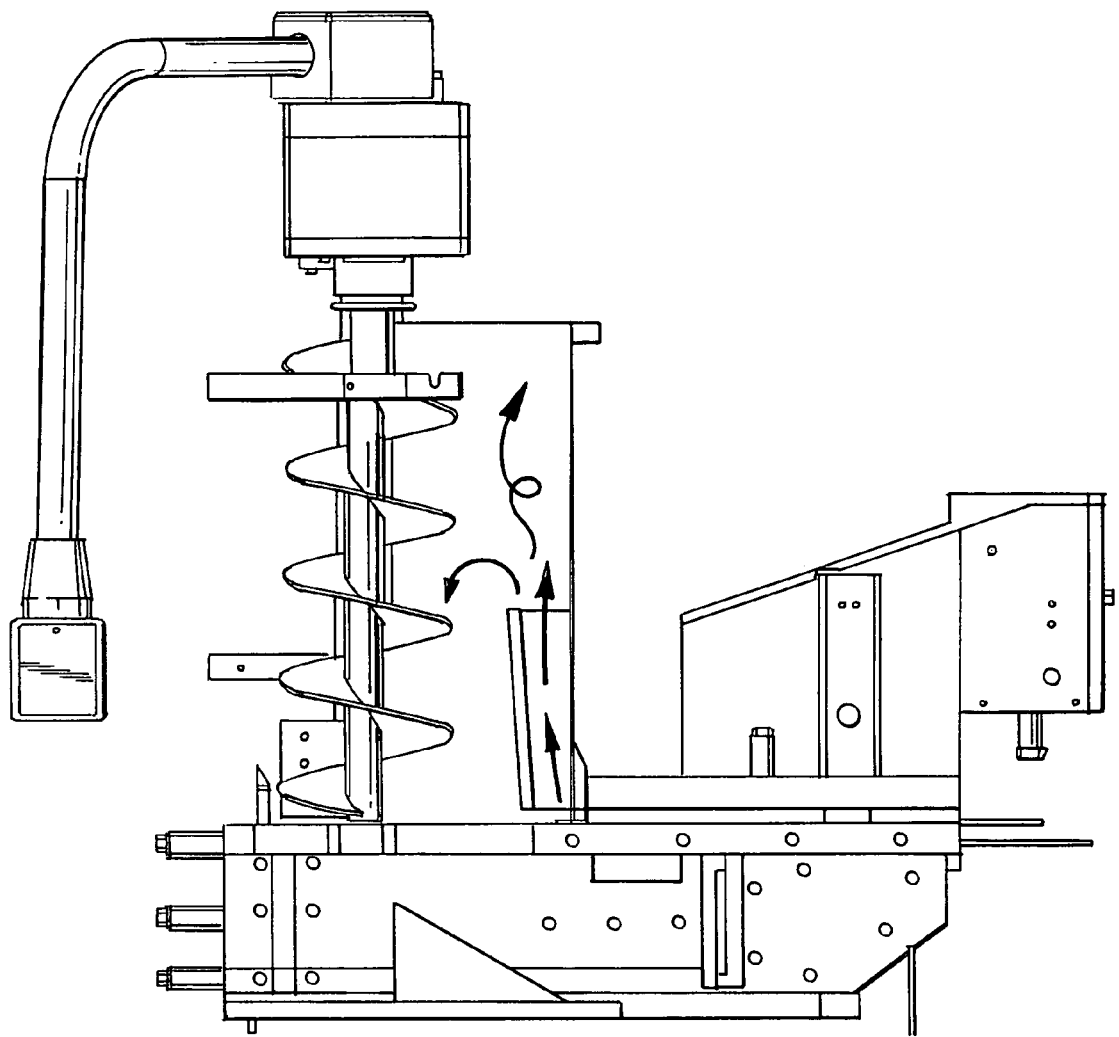
FIG. 22 is a detailed perspective view of the auger assembly and breather vent assembly incorporated in the feed product molding machine of FIG. 1.
Figure 23:
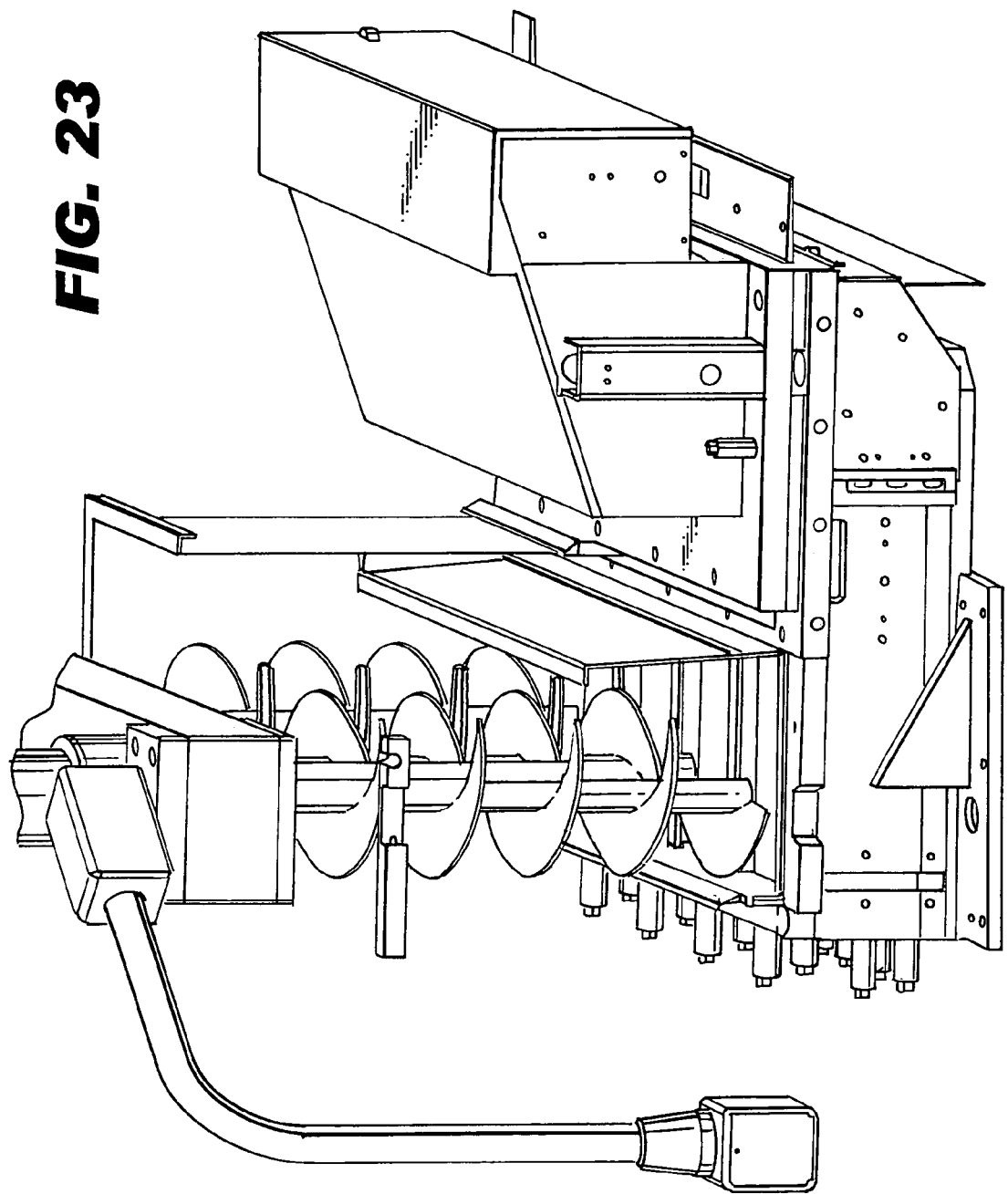
FIG. 23 is a detailed perspective view of the auger assembly and breather vent assembly incorporated in the feed product molding machine of FIG. 1.
Figure 24:
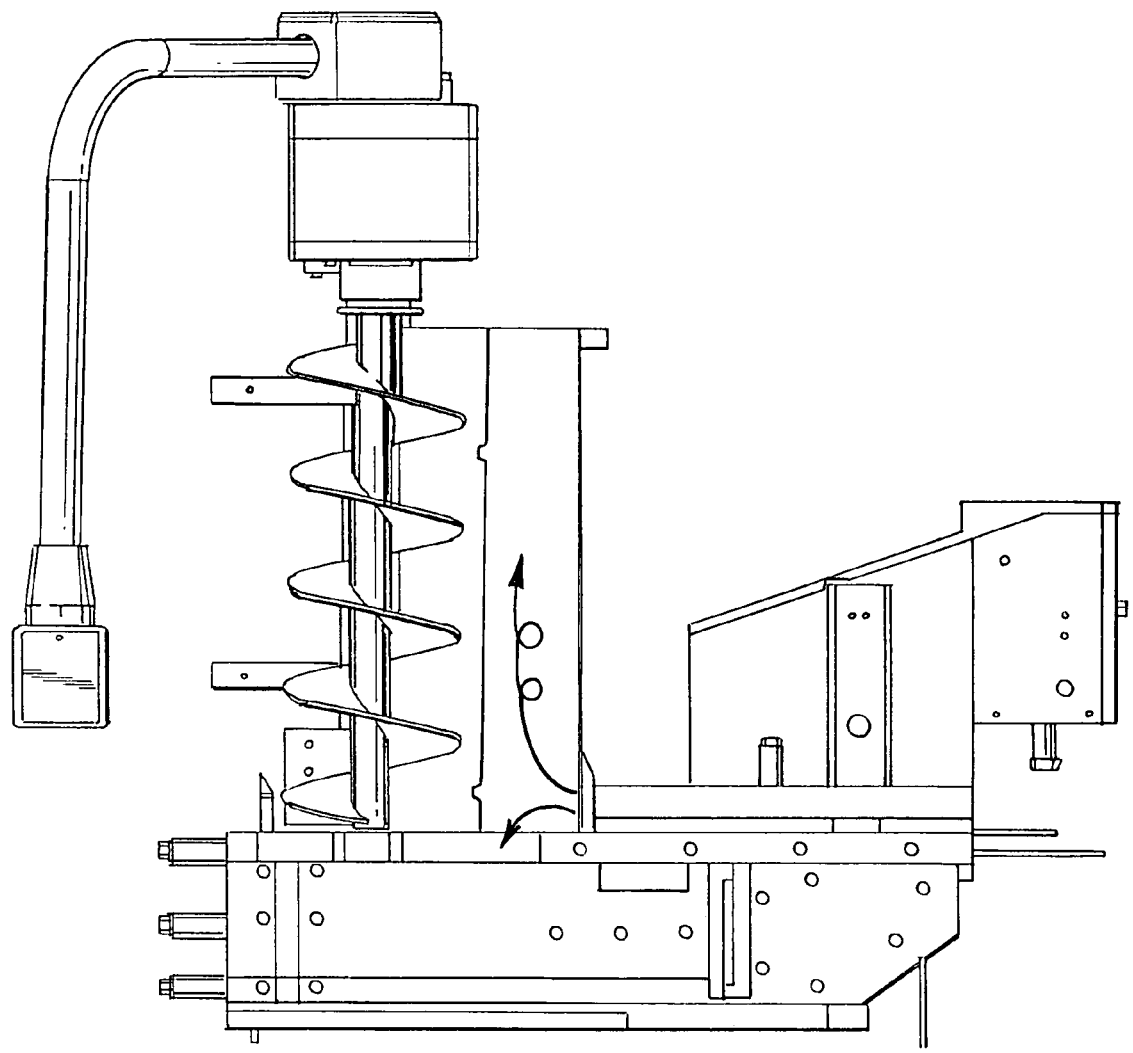
FIG. 24 is a detailed perspective view of the auger assembly and breather vent assembly incorporated in the feed product molding machine of FIG. 1.

FIGS. 22-24 show the detailed perspective view of the auger assembly and conveyer assembly incorporated in the feed product molding machine of FIG. 1. The arrows in FIGS. 22-24 show how the air and product flow through the machine.

Many variations of the invention can be made without departing from the spirit and scope of the invention.

The above discussion, examples, and embodiments illustrate our current understanding of the invention. However, since many variations of the invention can be made without departing from the spirit and scope of the invention, the invention resides wholly in the claims hereafter appended.

We claim:

1. A food product molding machine, comprising:
 an auger assembly;
 an auger cover enclosing the auger assembly; and
 a vent assembly configured to form a slot underneath the auger cover to receive an exhaust of air and excess food product, the vent assembly including a wall disposed behind the auger cover;
 a lower edge of said wall is in contact with an upper surface of a fill plate ensuring that air and excess food product is routed upwardly through a baffle defined by wall and a front panel.

* * * * *